United States Patent [19]

Wiecek

[11] Patent Number: 5,210,837
[45] Date of Patent: May 11, 1993

[54] METHODS AND APPARATUS FOR TRANSFORMING MACHINE LANGUAGE PROGRAM CONTROL INTO HIGH-LEVEL LANGUAGE CONSTRUCTS BY MANIPULATING GRAPHICAL PROGRAM REPRESENTATIONS

[75] Inventor: Cheryl A. Wiecek, Westford, Mass.

[73] Assignee: Digital Equipment Corporation, Maynard, Mass.

[21] Appl. No.: 538,906

[22] Filed: Jun. 15, 1990

[51] Int. Cl.$^5$ .............................................. G06F 9/45
[52] U.S. Cl. .................................. 395/375; 395/700; 364/973; 364/280.4
[58] Field of Search .......................... 365/375, 700, 800

[56] References Cited

U.S. PATENT DOCUMENTS

| | | | |
|---|---|---|---|
| 4,493,024 | 1/1985 | Baxter | 395/275 |
| 4,554,629 | 11/1985 | Smith | 395/800 |
| 4,633,406 | 12/1986 | Katz | 395/375 |
| 4,667,290 | 5/1987 | Goss | 395/700 |
| 4,683,544 | 7/1987 | Hariki | 395/86 |
| 4,734,848 | 3/1988 | Yamano | 395/650 |
| 4,755,932 | 7/1988 | Diedrich | 395/500 |
| 4,831,580 | 5/1989 | Yamada | 395/133 |
| 5,005,152 | 4/1991 | Knustsen | 395/700 |
| 5,088,034 | 2/1992 | Ihara | 395/700 |
| 5,101,491 | 3/1992 | Katzeff | 395/700 |

OTHER PUBLICATIONS

Hopwood, "Decompilation," Ph.D. Thesis for the University of California, Irvine (copyright 1978).

Housel, III, Barron C., "A Study of Decompiling Machine Languages Into High Level Machine Independent Languages," Ph.D. Thesis for Purdue University in 1973.

Friedman, Frank L., "Decompilation and the Transfer of Mini-Computer Operating Systems," Ph.D. Thesis for Purdue University in 1974.

Housel, Baron C. and Halstead, Maurice H., "Methodology of Machine Language Decompilation," Proceedings of ACM Annual Conference (1974).

May, William, "A Simple Decompiler," Dr. Doff's Journal, pp. 50-55, 68, 70-72, vol. 13, issue 6 (Jun. 1988).

Horspool R. N., and Marovac, N. "An Approach to the Problem of Detranslation of Computer Programs," The Computer Journal, vol. 23, pp. No. 3223-229 (Aug. 1980).

Sassaman, "A Computer Program to Translate Machine Language Into Fortran," Proceedings Spring Joint Computer Conference, AFIPS, vol. 28, pp. 235-239 (1966).

Dejean, David M. and Zobrist, George W., "A Definition Optimization Technique Used in A Code Translation Algorithm," Communications of the ACM, vol. 32, No. 1, pp. 94-105 (Jan. 1989).

Lichtblau, U., "Decompilation of Control Structure by Means of Graph Transformations," Lecture Notes in Computer Science, Proceedings of the International Joint Conference on Theory and Practice of Software Development, vol. 1:Colloquium on Trees and Algebra and Programming, pp. 284-297 (Mar. 25-29, 1985).

(List continued on next page.)

Primary Examiner—David Y. Eng
Attorney, Agent, or Firm—A. Sidney Johnston; Ronald E. Myrick; Barry N. Young

[57] ABSTRACT

A method for translating an initial program flow representation of a computer program into a modified program flow representation examines paths in the initial program flow representation, selects for replication nodes which have multiple predecessor nodes and a single successor node which have never been path search exit nodes and which are neither loop members of successors of loop members. Some of those selected nodes are then replicated and replace the nodes that were replicated. The program flow representation can then be reduced by combining nodes which have a predetermined relationship. This resulting flow representation is well suited for translation into a desired computer language.

57 Claims, 13 Drawing Sheets

OTHER PUBLICATIONS

Fujimoto, Richard M. and Campbell, William B., "Efficient Instruction Level Simulation of Computers," Transactions of the Society for Computer Simulation, vol. 5, No. 2, pp. 109-124 (Apr. 1988).

Allen, Frances E., "Control Flow Analysis" Sigplan Notices vol. 5, No. 7, pp. 1-19 (Jul. 1970).

Cocke, John and Schwartz, J. T., "Programming Languages and Their Compilers, Preliminary Notes," Courant Institute of Mathematical Sciences (2d Ver. 1970).

Yoo, Chae Woo, "An Approach to the Transportation of Computer Software," Information Processing Letters 21, pp. 153-157 (Sep. 5, 1985).

Kennedy, Ken, "A Survey of Data Flow Analysis Techniques," Chapter 1 of Programming Flow Analysis: Theory and Applications, Steven S. Muchnick & Neal D. Jones, pp. 5-54 (1981).

Baker, Brenda S., "An Algorithm for Structuring Flowgraphs," Journal of the Association for Computer Machinery, vol. 24, No. 1, pp. 98-120 (Jan. 1977).

Coutant, Debra S., Hammond, Carol L. and Kelley, John W., "Compiler for the New Generation of Hewlett-Packard Computers," Hewlett-Packard Journal, pp. 4-18 (Jan. 1986).

Linger, Richard C. Mills, Harlan D. and Witt, Bernard I., "Structured Programs" Chapter 4 from Structure of Programming: Theory and Practice, pp. 91-145 (1979).

AT&T Looks at Portable Innovation Computer Weekly, p. 935 (Nov. 1, 1984).

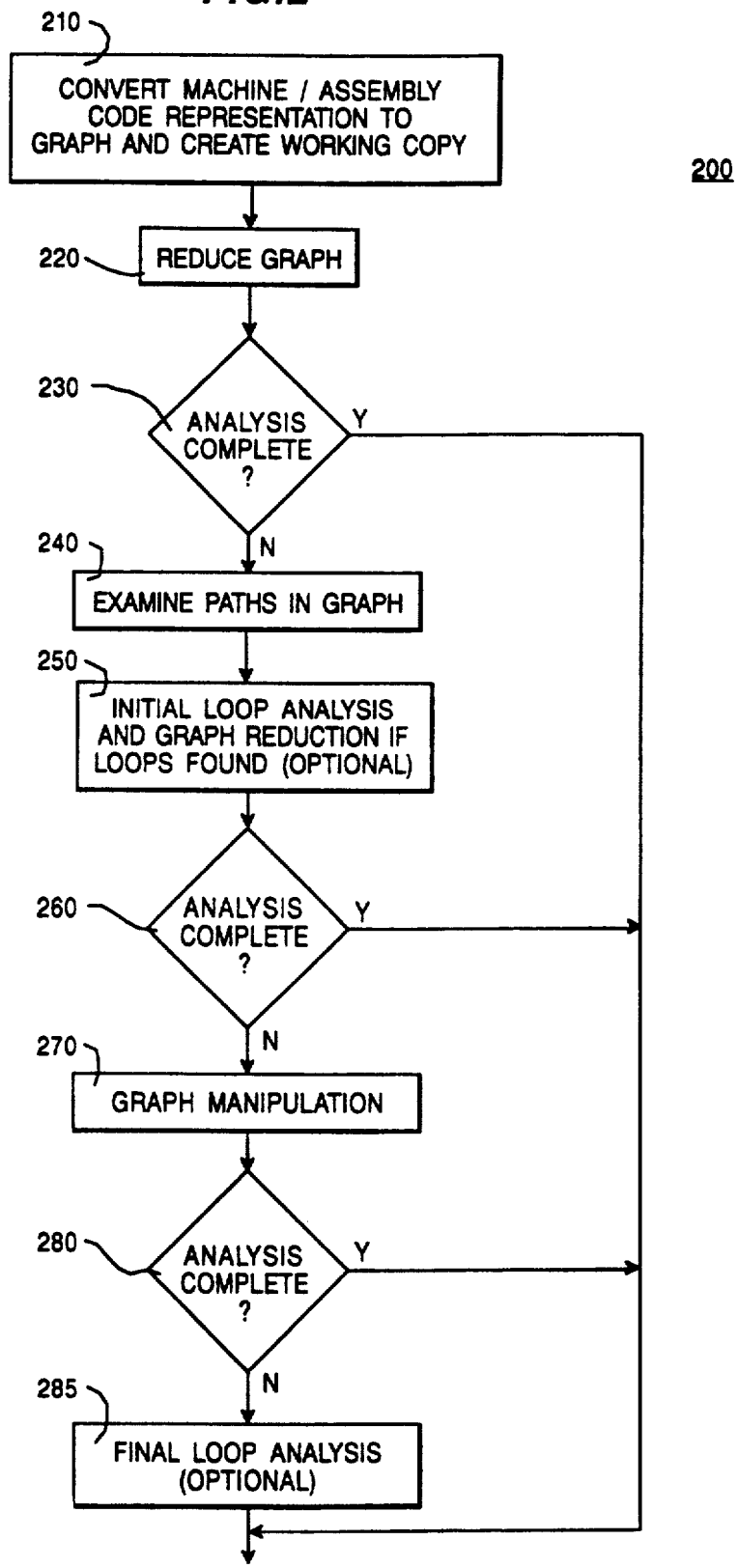

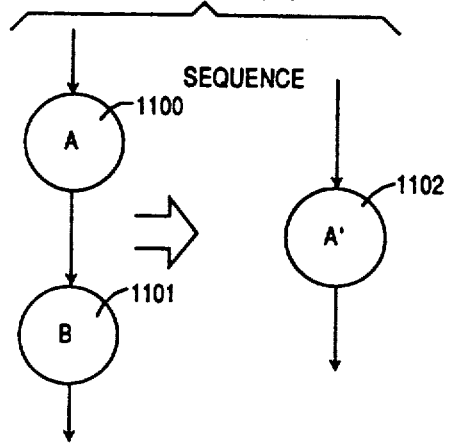
*FIG.11(a)*
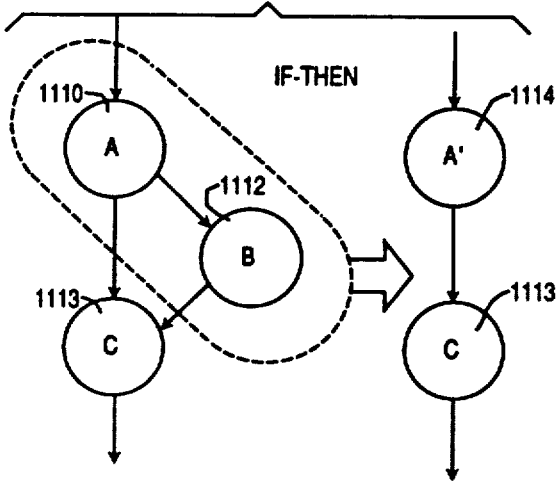
*FIG.11(b)*
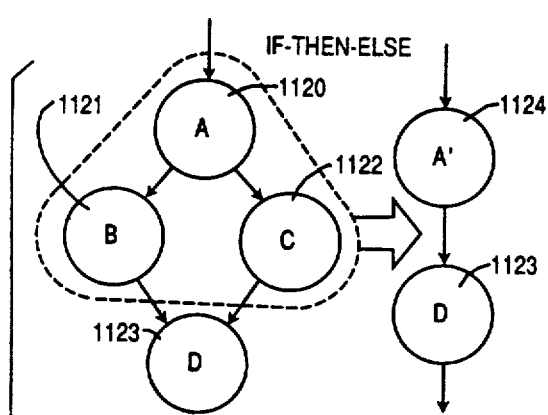
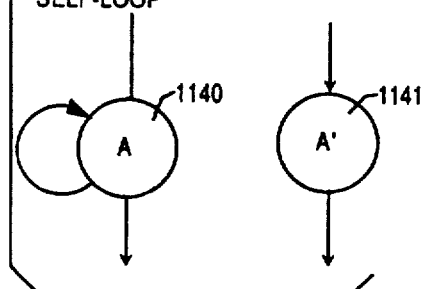
*FIG.11(c)*
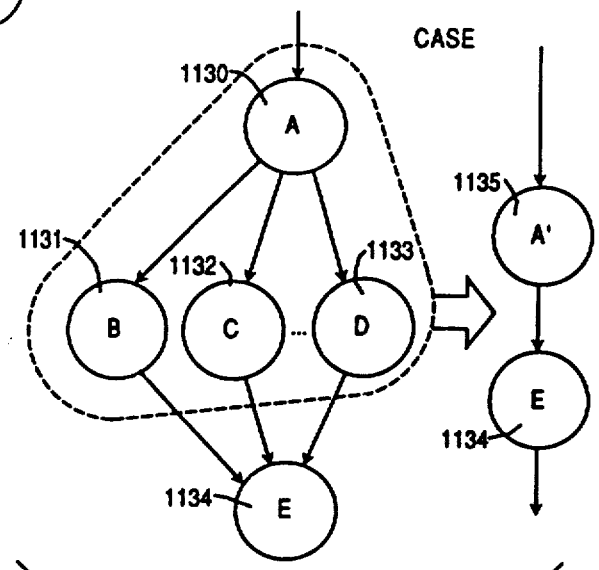
*FIG.11(d)*

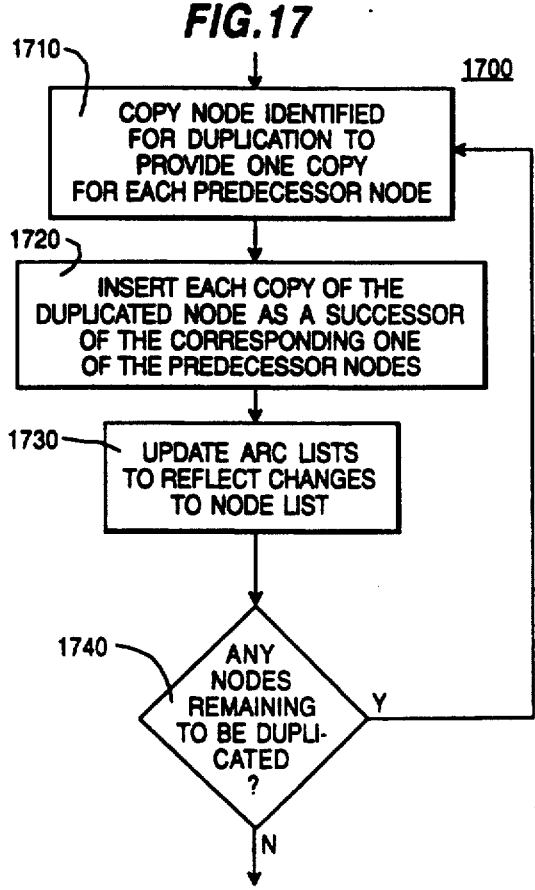
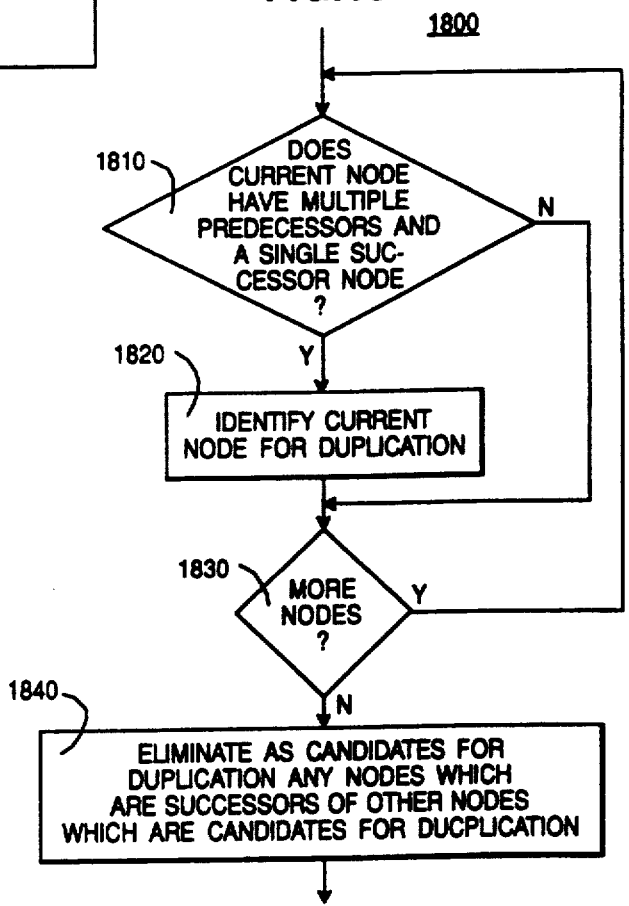

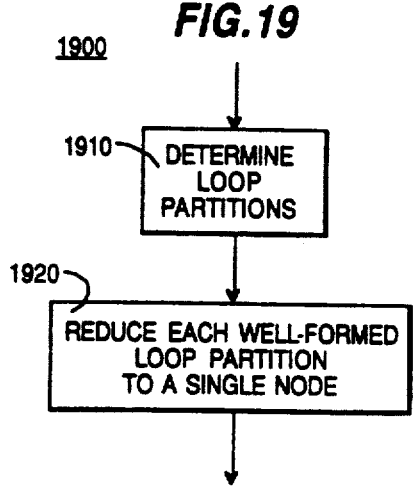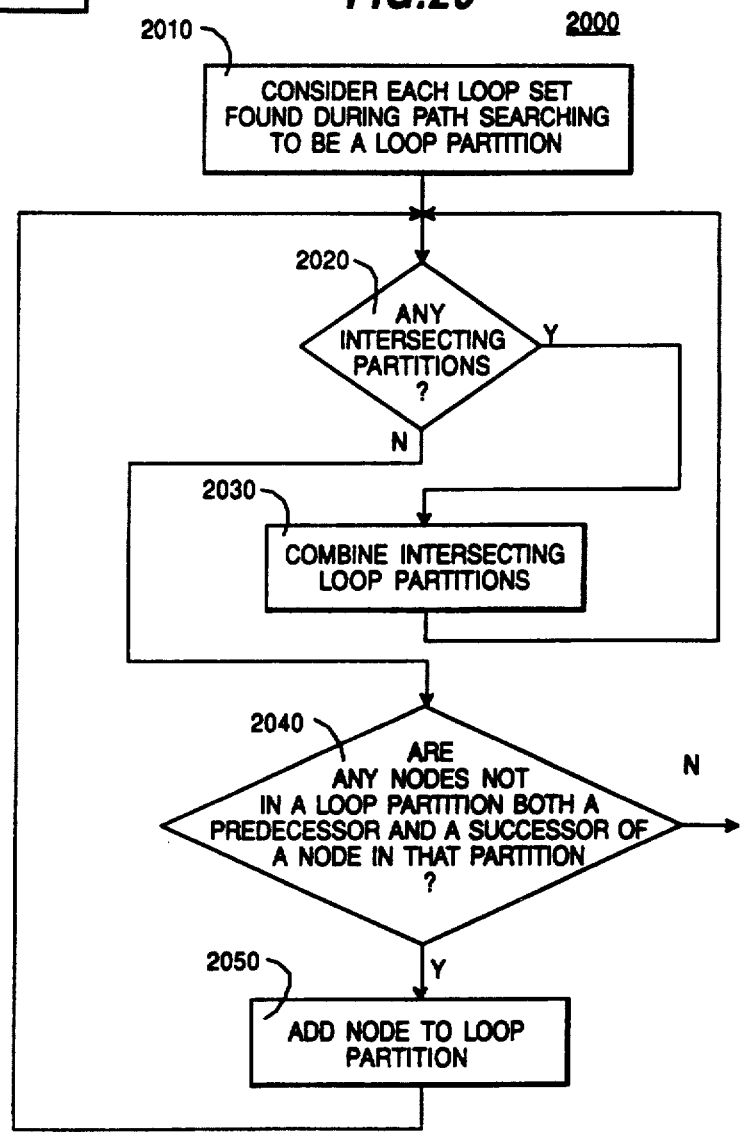

METHODS AND APPARATUS FOR TRANSFORMING MACHINE LANGUAGE PROGRAM CONTROL INTO HIGH-LEVEL LANGUAGE CONSTRUCTS BY MANIPULATING GRAPHICAL PROGRAM REPRESENTATIONS

I. BACKGROUND OF THE INVENTION

The present invention relates to the translation of programs between languages, and in particular, to the conversion of a program written in one machine language into a flow graph and then into a program in a different language, preferably a high level language (HLL).

As a greater number of computer manufacturers employ more operating systems and programming languages, greater importance must be given to the conversion of programs written for one machine and one operating system into forms that can execute on other machines or other operating systems. For example, when a customer wishes to purchase different hardware or wishes to change operating systems, that customer must often face the complete loss of all of the programs that had been written for the previous machine and operating system. This investment can reach millions of dollars and cause severe disruption in the operation of the customer's business.

Because of the complexity of the programs and the sheer number of such programs that need to be converted, it is impractical to consider converting these programs manually. The task is simply too large for significant human intervention.

Converting programs automatically, however, is a difficult task. If all programs had the same type of structure, then conversion of programs might be relatively easy. However, experience has shown that few programs have the same structure and there is no standard structure for programs. Therefore, a general purpose program translation mechanism must be able to accommodate several different program structures.

The differences in structure, however, cause problems. For example, the language of the program to be translated may allow certain instructions which generate program structures and flows that cannot be easily implemented in the language for which the translation is desired. Assembly language code may be written with complex looping behavior that is not easy to map into HLL code. Loops are defined as code which, when executed, repetitively passes through the same program portion.

Another example of a problem in translating a program from machine language to HLL arises from use of the unconditional branch or GOTO statements. Well-structured programs in HLLs generally avoid the use of such statements because their use often results in programs that are difficult to understand and maintain. Previous work on translating programs from machine language to HLL has not been very successful in eliminating the GOTO structure in the translated code. In some cases, the GOTO structure is added manually during translation, which is undesirable.

A third example of a problem encountered in code conversion is complicated program structure. Often such structure has evolved in programs which have been modified extensively. This is because many programs which have been in use for some time are commonly repaired by the use of "patches." Patches are generally small program fixes which are designed to correct a specific minor problem yet minimize the changes to the entire program code. The problem with patches is that they create difficult program flows, and are thus often difficult to convert. Ironically, the programs which have been used for the longest time are generally the ones most in demand for conversion, but they also often have the most patches.

Typically, the process of converting programs from a machine language to a HLL involves a "decompilation" step. The decompilation step converts a program written in a low level language into a higher order language. A construct often used in decompilation is a control-flow graph. If the original program was well structured, the resulting flow graph is usually reducible, meaning that the flow graph can be simplified using known control structuring rules. If the original program is not well structured, however, the resulting flow graph is often irreducible. This is a problem that conventional techniques for converting between machine and HLLs have not adequately addressed.

One object of this invention is to provide an automated method and apparatus for translating programs from machine language to a HLL which requires only minimal human intervention.

Another object of this invention is to provide such an automated method and apparatus which can accommodate difficult structures such as loops and GOTO statements in the machine language program.

Still another object of this invention is to provide an automated method and apparatus for removing undesirable code structures from the translated program.

II. SUMMARY OF THE INVENTION

The present invention overcomes the problems of the prior art and achieves the objects listed above by judicious node-splitting in the flow graph for the program written in the original code. This node-splitting allows the graph to be simplified in an automated manner by repetitive application of reduction rules. This invention also allows new routines for code duplication to be used in the translated code.

More specifically, to achieve the objects and in accordance with the purpose of this invention, as implemented and described herein, a method of this invention automatically transforms an initial program flow representation of a computer program into a modified program flow representation. The computer program contains sequentially-ordered blocks of consecutive instructions written in a first computer language, and the initial program flow representation includes a plurality of nodes each representing a different one of the blocks of instructions. The nodes in the initial program flow representation are connected in paths reflective of the possible sequences which the blocks of instructions may be executed in accordance with the computer program, and the connection, in any of the paths, of a first one of the nodes representing a first block of instructions to a second one of the nodes representing a second block of instructions to reflect the execution in the computer program of the first block of instructions immediately prior to the execution of the second block of instructions makes the first node a predecessor node to the second node and the second node a successor node of the first node. The method includes steps, performed by a computer, of: examining the paths in the initial program flow representation to identify the ones of the nodes which are members of loops and the ones of the nodes which are path search exit nodes; selecting the ones of the nodes which have multiple predecessor nodes and a single successor node, which are not loop members or successor nodes of loop members, and which are not path search exit nodes; replicating each of the selected nodes such that a different copy of each selected node is formed to correspond to each predecessor node of that selected node; replacing each of the selected nodes in the initial program flow representation with the copies of that selected node; and connecting each of copies of each of the selected nodes to the predecessor node and the single successor node corresponding to that selected node. Loops include ones of the paths that reflect sequences of repetitive instruction block execution, and the ones of the nodes lying in the paths in loops are deemed members of a loop. Path search exit nodes are the ones of the nodes which occur at the exit of a control substructure in the program flow representation and in the modified program flow representation.

A data processing system according to this invention transforms an initial program flow representation of a computer program into a modified program flow representation. The computer program contains sequentially-ordered blocks of consecutive instructions written in a first computer language, and the initial program flow representation includes a plurality of nodes each representing a different one of the blocks of instructions. The nodes in the initial program flow representation are connected in paths reflective of the possible sequences which the blocks of instructions may be executed in accordance with the computer program, and the connection, in any of the paths, of a first one of the nodes representing a first block of instructions to a second one of the nodes representing a second block of instructions to reflect the execution in the computer program of the first block of instructions immediately prior to the execution of the second block of instructions makes the first node a predecessor node to the second node and the second node a successor node of the first node. The data processor comprises a memory system for storing the computer program, the initial program flow representation, and the modified program flow representation, the memory system including an instruction list containing the instructions in the blocks of consecutive instructions, a node list containing information about each of the nodes and identifying the corresponding block of instructions by reference to the instruction list, and arc lists containing information about the paths of the initial program flow representation. The data processor also comprises: means, coupled to the memory system, for examining the paths in the initial program flow representation using the arc and node lists to identify the ones of the nodes which are members of loops and which are path exit nodes; means, coupled to the memory system, for setting a loop found flag in the corresponding entry of the node list for those of the nodes which are loop-found nodes; means, coupled to the memory system, for examining the node list to select the ones of the nodes which have multiple predecessor nodes and a single successor node, and for which neither the loop member flag nor path exit flag is set; means, coupled to the memory system, for replicating each of the node list entries for the selected nodes such that a different copy of each of the node list entries is formed for each predecessor node of the corresponding node, and for replacing each of the selected nodes in the initial program flow representation with the copies of that selected node by adding the replicated node list entries to the node list; and means, coupled to the memory system, for connecting each replicated node list entry to a corresponding entry in the arc lists such that the nodes corresponding to the replicated node list entries are connected to the corresponding predecessor node and single successor node, the replication of the node list entries and their connection to the arc list entries forming the modified program flow representation. Loops include ones of the paths that reflect sequences of repetitive instruction block execution, the ones of the nodes lying in the paths in loops being deemed members of a loop, and path search exit nodes are the ones of the nodes which occur at the exit of a control substructure in the program flow representation and in the modified program flow representation.

Another perspective of this invention is a method of automatically transforming an initial program flow representation of a computer program into a modified program flow representation. The computer program contains sequentially-ordered blocks of consecutive instructions written in a first computer language, and the initial program flow representation includes a plurality of nodes each representing a different one of the blocks of instructions. The nodes in the initial program flow representation are connected in paths reflective of the possible sequences which the blocks of instructions may be executed in accordance with the computer program, and the connection, in any of the paths, of a first one of the nodes representing a first block of instructions to a second one of the nodes representing a second block of instructions to reflect the execution in the computer program of the first block of instructions immediately prior to the execution of the second block of instructions makes the first node a predecessor node to the second node and the second node a successor node of the first node. The method comprises the steps, performed by a computer of: examining the paths in the initial program flow representation to identify the ones of the nodes which are members of loops and the ones of the nodes which are path search exit nodes; combining the loops into single nodes; selecting the ones of the nodes which have multiple predecessor nodes and a single successor node, and which are not path search nodes; replicating each of the selected nodes such that a different copy of each selected node is formed to correspond to each predecessor node of that selected node; replacing each of the selected nodes in the initial program flow representation with the copies of that selected node; and connecting each of copies of each of the selected nodes to the predecessor node and the single successor node corresponding to that selected node, the replication of selected nodes and the connection of the copies forming a modified program flow representation. Loops include ones of the paths that reflect sequences of repetitive instruction block execution, and the ones of the nodes lying in the paths in loops are deemed members of a loop. Path search exit nodes are the ones of the nodes which occur at the exit of a control substructure in the program flow representation and in the modified program flow representation.

The accompanying drawings, which are incorporated in and which constitute part of this specification, illustrate implementations of this invention and, together with the accompanying textual description, explain the principles of the invention.

III. BRIEF DESCRIPTION OF THE DRAWINGS

FIG. 2 is a flow diagram of a main control procedure in accordance with a preferred implementation of the present invention;

Figure 15:
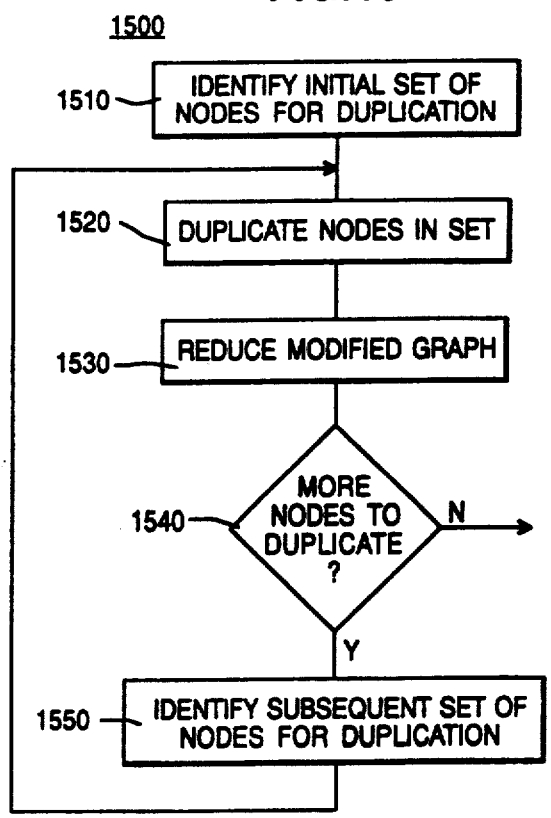
Figure 13:
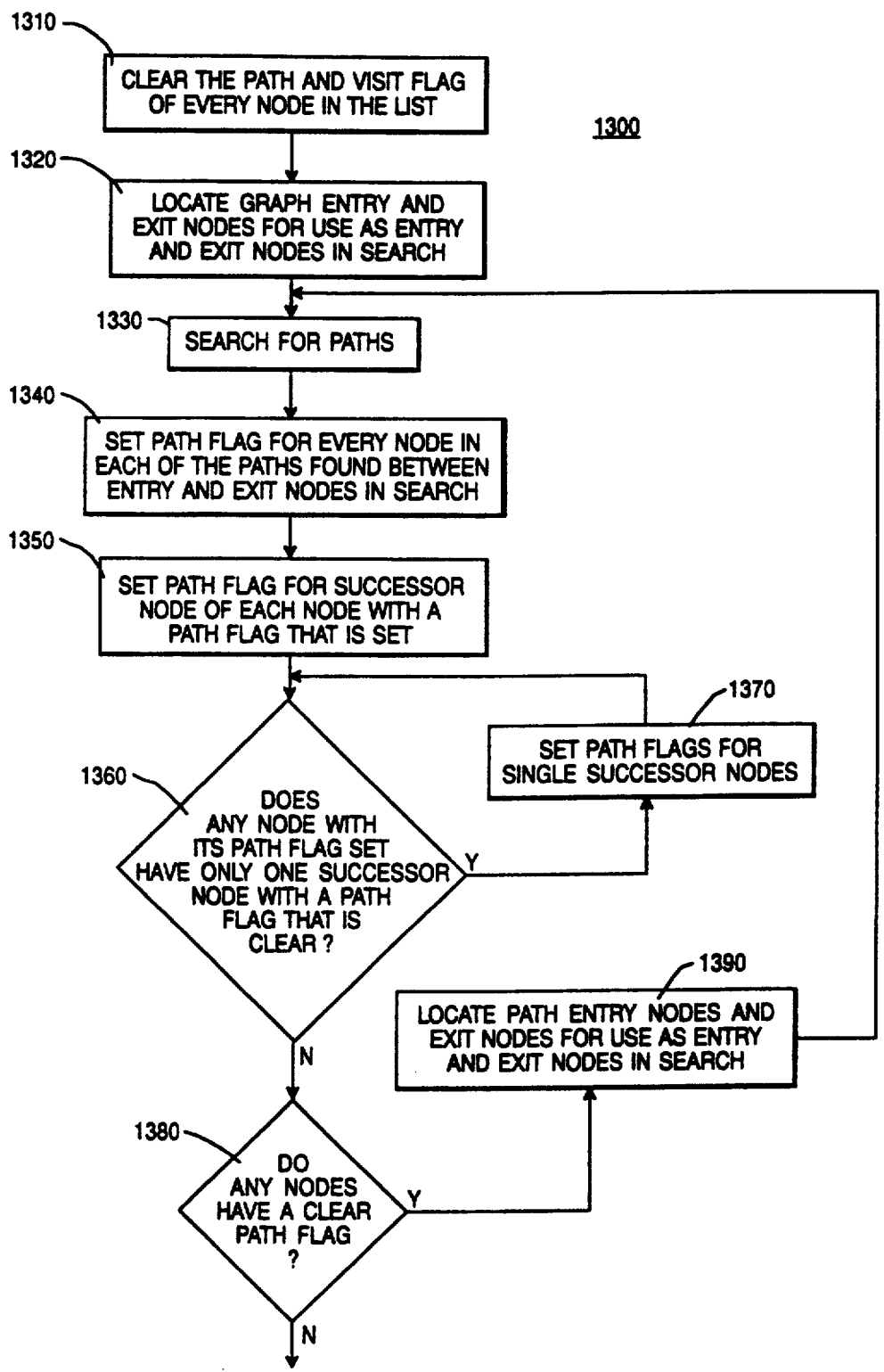
Figure 14:
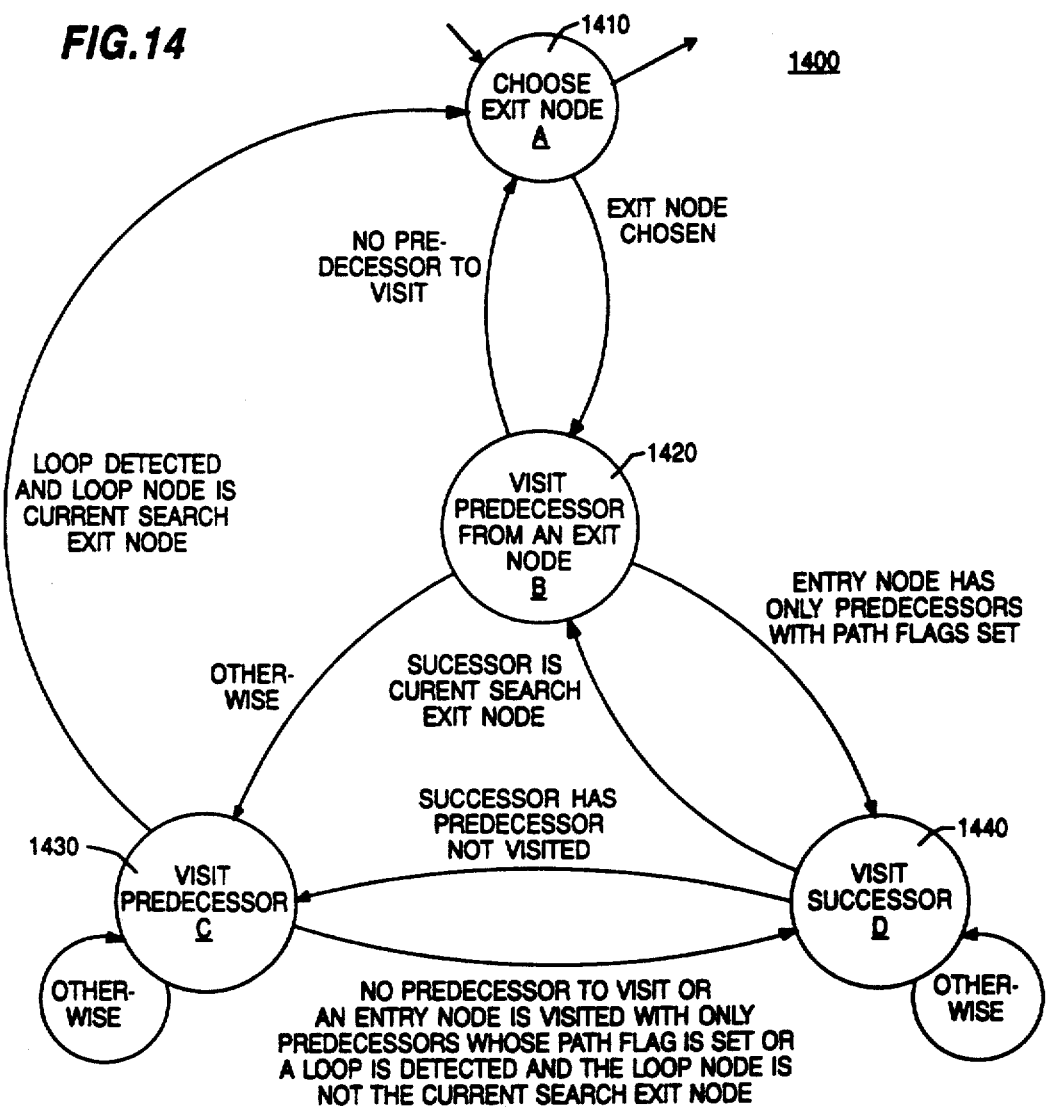
Figure 16:
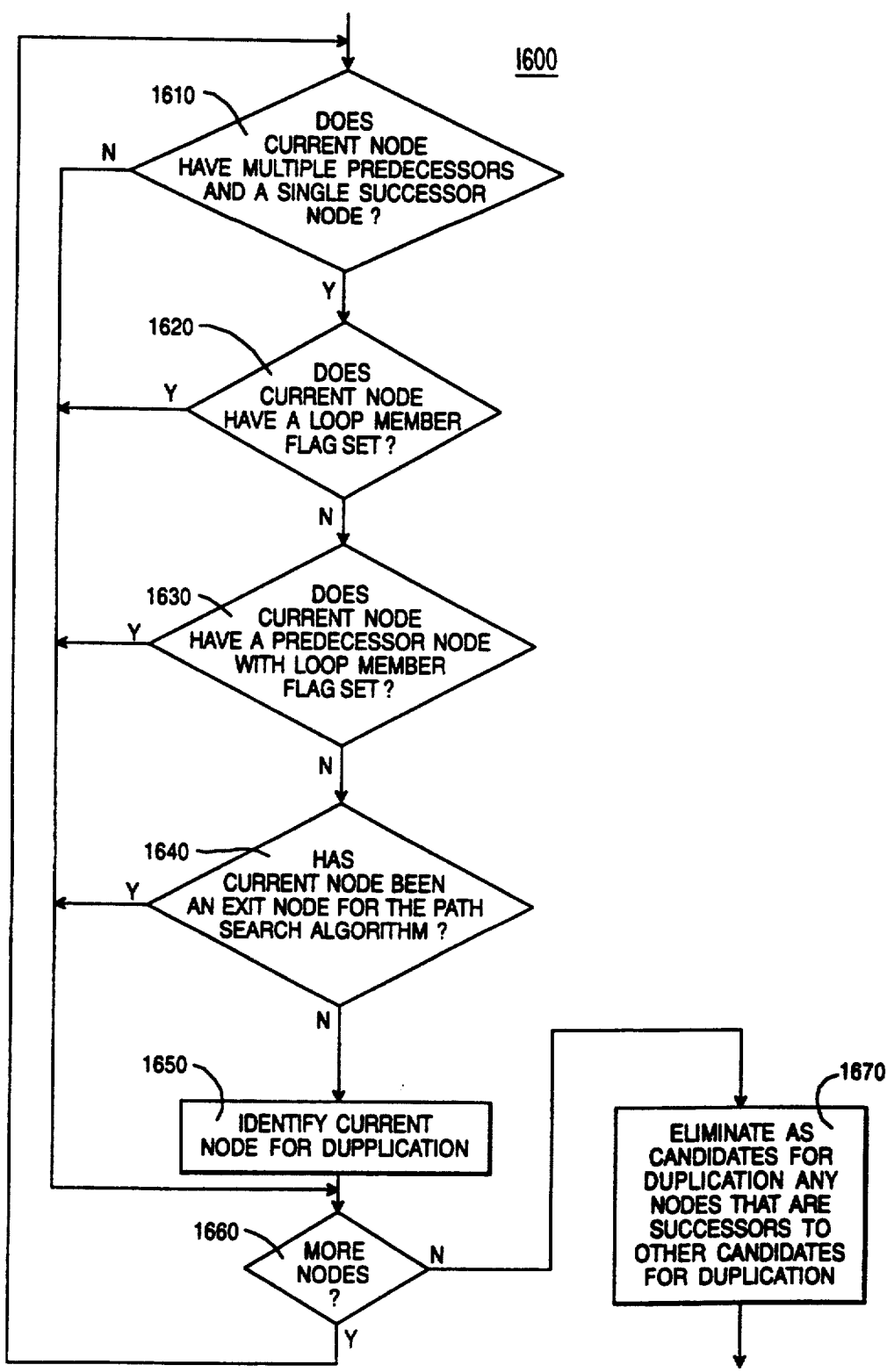

FIGS. 11(a)-(e) are representations of several reduction rules which may be applied in accordance with a preferred implementation of the present invention;

FIGS. 12(a)-(d) are representations of several stages of a graph which is reduced in accordance with the rules represented in FIGS. 11(a)-(e);

FIG. 13 is a flow diagram of a main control loop for path search in accordance with a preferred implementation of the present invention;

FIG. 14 is a diagram of a control state machine for a path search in accordance with a preferred implementation of the present invention;

FIG. 15 is a flow diagram of a graph manipulation loop in accordance with a preferred implementation of the present invention;

FIG. 16 is a flow diagram of a procedure for identifying an initial set of nodes for duplication in accordance with a preferred implementation of the present invention;

FIG. 17 is a flow diagram of a node duplication loop in accordance with a preferred implementation of the present invention;

FIG. 18 is a flow diagram of a procedure for identifying a subsequent set of nodes for duplication in accordance with a preferred implementation of the present invention;

FIG. 19 is a flow diagram of a procedure for analyzing loops in accordance with a preferred implementation of the present invention; and FIG. 20 is a flow diagram of a procedure for determining loop partitions in accordance with a preferred implementation of the present invention.

IV. DESCRIPTION OF THE PREFERRED EMBODIMENTS

Reference will now be made in detail to preferred implementations of this invention, examples of which are illustrated in the accompanying drawings.

A. GENERAL OVERVIEW

Figure 1:
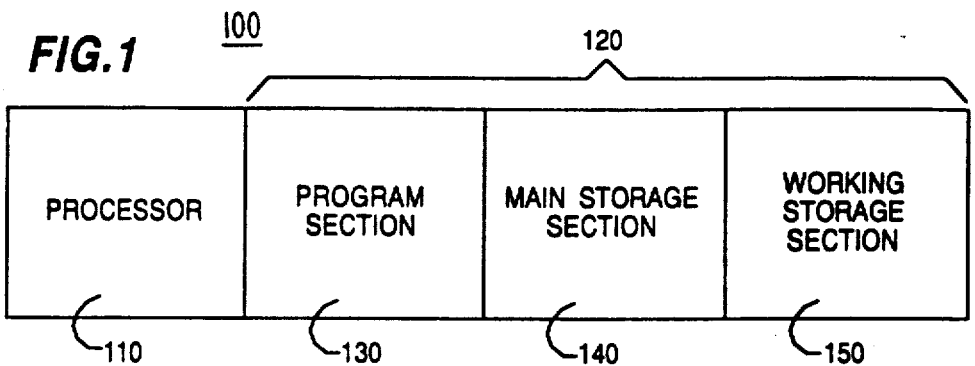
FIG. 1 is a diagram of a data processing system which can execute procedures in accordance with a preferred implementation of the present invention.

FIG. 1 is a diagram of a data processing system 100 which can be used in accordance with this invention. Included in data processing system 100 are a processor 110, which is capable of executing programs to implement the methods described below, and a memory 120, which stores those programs as well as the data acted upon by those programs. Memory 120 preferably includes a program section 130, a main storage section 140, and a working storage section 150. Program section 130 contains the programs to be executed in accordance with the methods of this invention.

Main storage section 140 contains copies of the programs to be converted in accordance with this invention (called "source programs"), as well as representations of the source programs which are easier to use for translation purposes. Working storage section 150 contains working copies of any lists and other data structures, including those described below, which are generated during the preferred implementation of the method of this invention.

The particular design of data processing system 100 and its constituent parts is not important to the operation of this invention. It is important, however, that the methods be performed automatically by a data processor.

Furthermore, the illustration of memory 120 as divided into discrete sections 130, 140, and 150 is merely for purposes of explanation, and is not meant to indicate that those sections must be physically separate. For example, it is possible for the different memory sections to be physically interleaved or for each to be wholly or partially resident in secondary storage devices.

FIG. 2 shows a flow diagram of the principal steps in a main control procedure 200 in accordance with the preferred implementation of this invention. Before beginning main control procedure 200, data processing system 100 would preferably be configured such that the machine code for the source program would be stored in main storage section 140 of memory 120, and the program executed during main control procedure 200 would either be in program section 130 of memory 120, or would be accessible to program section 130 from a secondary storage device such as a disk (not shown).

Figure 3:
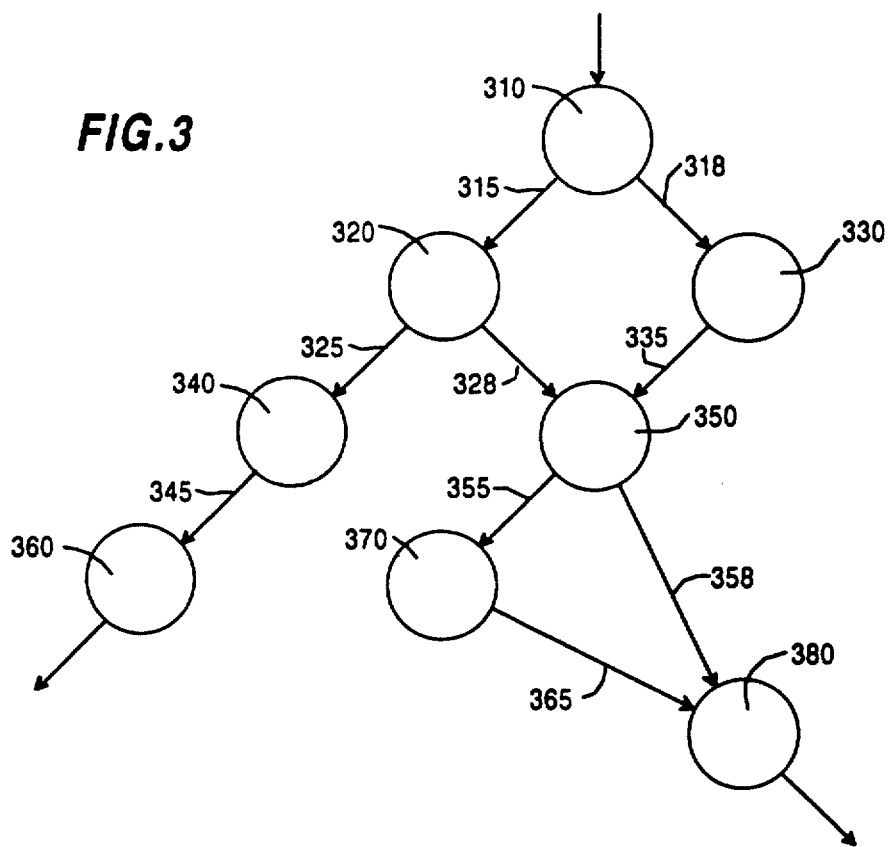
FIG. 3 is a representation of a graph into which a program was converted in accordance with a preferred implementation of the present invention.

In executing main control procedure 200, the representation of the source program stored in memory 120 is converted into a representation of a graph, such as graph 300 in FIG. 3, and a working copy of the representation of that graph is stored along with the graph in working section 150 of memory 120 (step 210). FIG. 3 is a diagram of a graph 300 which represents a program written in a machine or assembly language. The graph represented in memory 120 preserves the logical flow of the source program in a manner described in greater detail below.

Graph 300 includes nodes 310, 320, 330, 340, 350, 360, 370, and 380, each of which represents a different block of instructions. The logical flow of the source program is reflected by the manner in which nodes can be traversed using the arcs. Each different possible traversal of the graph from the entry at node 310 to the exit at nodes 360 and 380 is called a "path."

After the conversion of the source program representation into a graph, the working copy of the graph is reduced into a less complex version (step 220). The purpose of the graph reduction is to simplify the logical flow, without losing any logical information, in order to make conversion easier.

The reduced graph is then examined to see whether the analysis of that graph was complete (step 230). The analysis is complete if the graph cannot be further simplified.

If the analysis is not complete, the paths in the graph are examined (step 240). The examination is designed to find loops and determine whether certain nodes are of a type that may be duplicated in a later step.

Any remaining loops in the graph could also be initially analyzed and the graph reduced (step 250). A loop is defined more formally as a path in the graph which visits the same set of nodes more than once. The loop analysis step is optional in certain implementations.

After the paths in the graph have been examined and, if chosen, initial loop analysis and graph reduction performed, a determination is made to see whether the analysis is complete (step 260).

If analysis is not complete, graph manipulation takes place (step 270). In graph manipulation, certain of the nodes in that graph are selected for duplication, and the graph is expanded and placed into working section 150 of memory 120 by replacing certain nodes with multiple copies of nodes. The expanded graph is then reduced to a simpler version. This reduction is much like the earlier reduction (step 220), and is performed for the same reason of simplification.

Next, another determination is made to see whether the analysis of the graph is complete (step 280). The determination is also the same as the earlier determinations (steps 230 and 260).

If the analysis is not complete, then some final loop analysis may be required (step 285). When the analysis is complete (steps 230, 260 and 280), then the graph is either fully reduced and in the proper form to be converted into the appropriate high level language code, or is flagged as ill-formed and requiring some manual correction before conversion.

This description of main control procedure 200 provides an overview of the steps carried out in the preferred implementation of the present invention. The steps in main control procedure 200 will now be explained in greater detail, after certain terminology is defined.

As explained above, a graph consists of nodes interconnected by arcs or edges. An arc or an edge from a first node to a second node exists if the second node is a possible destination (or fall-through path) from the first node, as reflected by the order in which the blocks of instructions in the source program are executed.

If the block of instructions represented by a first node is executed before the block of instructions represented by the second node, then the first node is called a "predecessor" node of the second node, and the second node is called a "successor" node of the first node. Nodes can have multiple predecessors and multiple successors. For example, in graph 300 shown in FIG. 3, node 310 has two successors, nodes 320 and 330, and node 350 has two successors, nodes 370 and 380. Furthermore, node 350 has two predecessors, nodes 320 and 330, and node 380 has two predecessors, nodes 350 and 370.

Paths through a graph are traversed in a forward direction by proceeding through successive successor nodes. Paths are traversed in a reverse direction by proceeding through successive predecessor nodes.

The "graph entry nodes" are the nodes that must be entered first before traversing any paths in the graph. Graph entry nodes represent the blocks of instructions at the entry points to the program being represented by the graph. In graph 300 in FIG. 3, the only graph entry node is node 310. In certain circumstances, however, a graph may have more than one graph entry node.

The "graph exit nodes" are the last nodes traversed when leaving the graph. Graph 300 in FIG. 3 has two graph exit nodes: nodes 360 and 380.

The graph entry nodes may have predecessor nodes in the graph, and the graph exit nodes may have successor nodes in the graph. For example, in graph 300, node 340 could also be a graph entry node or a graph exit node.

B. CODE CONVERSION

Figure 4:
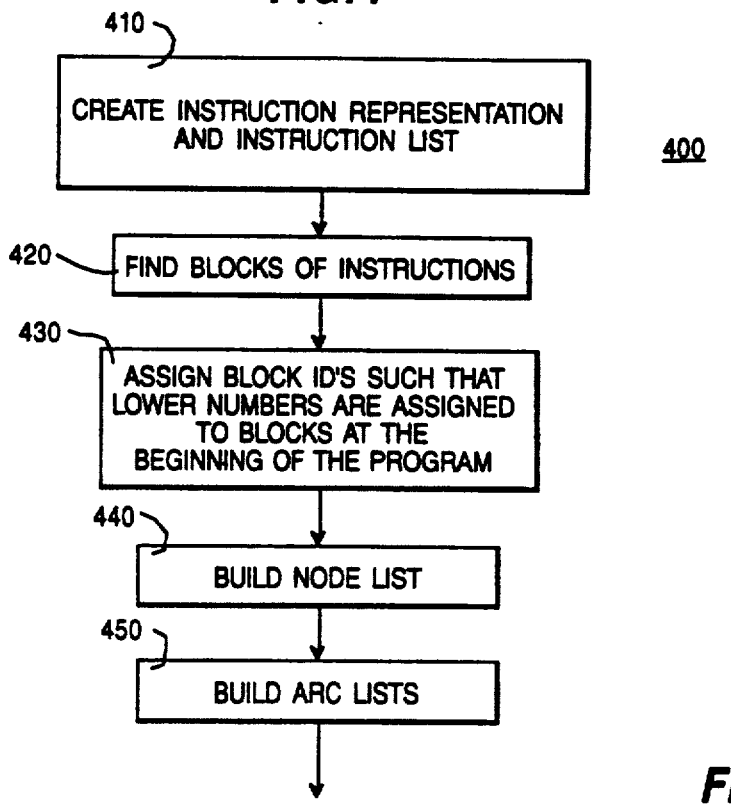
FIG. 4 is a flow diagram of a code conversion procedure for converting a machine language or assembly language code representation into a graphical form in accordance with a preferred implementation of the present invention.

FIG. 4 shows a flow diagram of a code conversion procedure 400 for converting the source program machine/assembly code representation to a graph (called a "source program graph"), as indicated in step 210 of FIG. 2. Preferably, code conversion flow procedure 400, as well as the other procedures described below, would be implemented by processor 110 (see FIG. 1) executing a computer program resident in program section 130 of memory 120.

Figure 5:
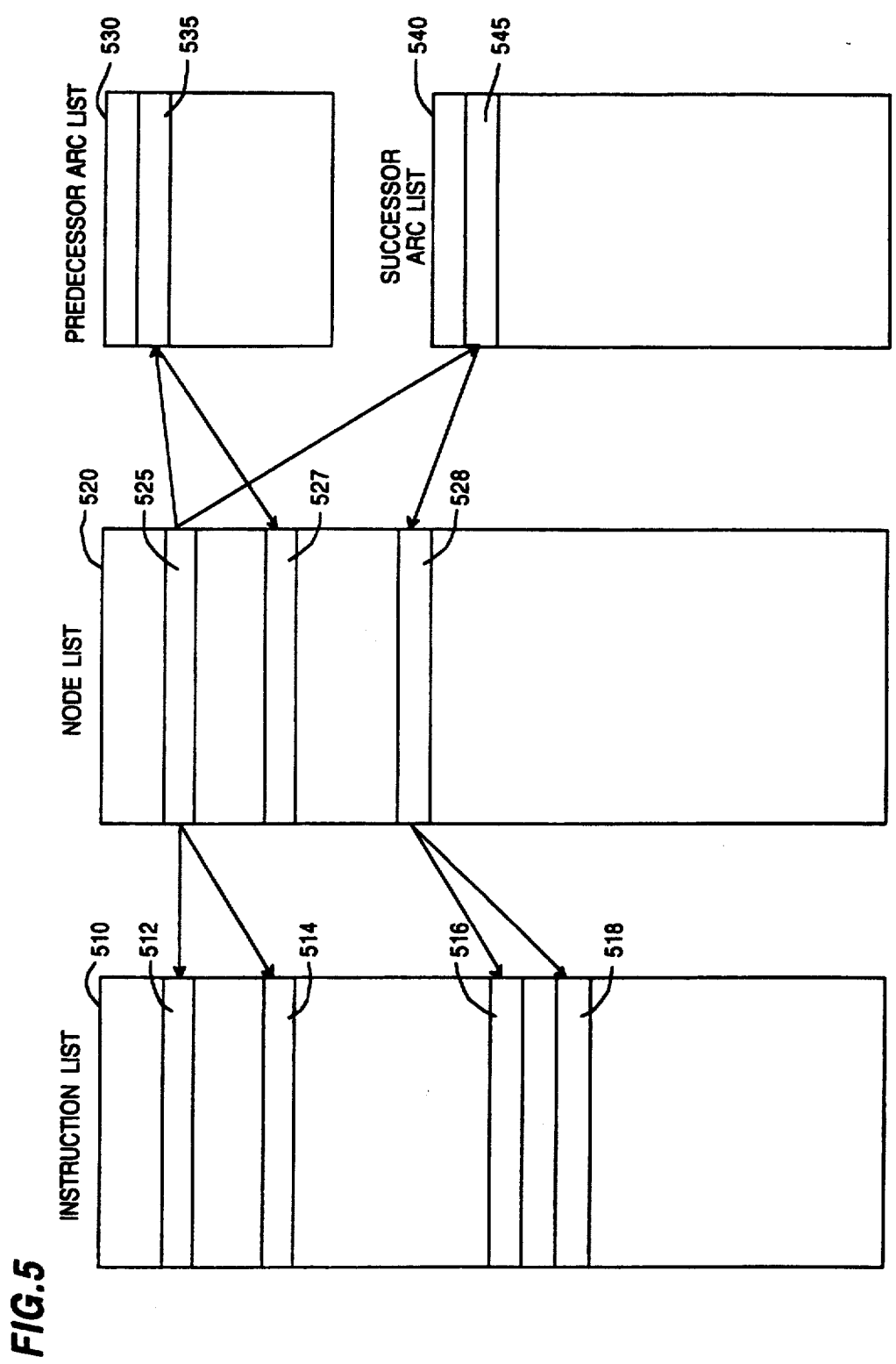
FIG. 5 is a diagram of an instruction list, a node list, a predecessor arc list, and a successor arc list in accordance with a preferred implementation of the present invention.

The first step in code conversion procedure 400 is the creation of the source code instruction representation, which has been explained as a construct to facilitate code conversion, and an instruction list, which is a list of all the instructions in the source program representation (step 410). FIG. 5, which is a diagram of certain portions of the working section 150 of memory 120, shows an instruction list 510 resident in working section 150.

Figure 6:
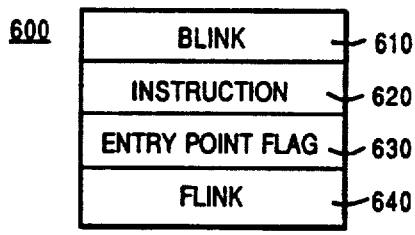
FIG. 6 is a representation of an instruction list element in accordance with a preferred implementation of the present invention.

Instruction list 510 preferably consists of several instruction list elements. FIG. 6 shows an example of an instruction list element 600 created during the code conversion procedure 400. Instruction list 510 is preferably formed as a linked list. Thus, instruction list element 600 includes a backward pointing link BLINK 610 pointing to the previous list element, and a forward pointing link FLINK 640 pointing to the next list element. Preferably, the order of the elements reflects the order of the instructions in the source program representation. The combination of all the BLINKs and FLINKs of the different elements forms instruction list 510 into a linked list.

Instruction list element 600 also includes an indicator of the corresponding instruction representation 620. The indicator 620 is preferably a pointer to a representation of the instruction from the source program in working storage section 150 of memory 120.

Instruction list element 600 also preferably includes an entry point flag 630. Entry point flag 630 would be set only if the corresponding instruction were an entry point into the source program.

In procedure 400 (FIG. 4), after instruction list 510 is created, the instructions are grouped into blocks of instructions (step 420). A block of instructions, also referred to as a code block, is defined as a sequence of instructions where control (i.e., logic flow) only enters at a first instruction and where control leaves either at a last instruction or a last instruction sequence.

If the source program is written in VAX MACRO, an assembly language used in VAX computers running VMS operating systems (all of which are provided by Digital Equipment Corporation), the beginning of blocks of instructions may be defined by locating instructions having a defined label. In addition, certain control instructions signal the end of a block of instructions. In the VAX MACRO assembly language, these control instructions can be one of four types: case branch instructions (CASEB, CASEW, CASEL); miscellaneous branch instructions (RSB, RET, REI, BPT, BUGW, BUGL, CHMU, CHMS, CHME, CHMK, HALT, XFC); unconditional branch instructions (BRB, BRW, JMP); and conditional branch instructions. If a conditional branch instruction is not followed by an unconditional branch instruction, the conditional branch instruction is itself the last instruction in the block. If the conditional branch instruction is followed by an unconditional branch instruction, then the pair of branch instructions is the end of the instruction block. Procedure branch instructions (BSBB, BSBW, CALLG, CALLS, JSB) preferably do not signal the end of a block of instructions because it is assumed that there is a matching return to each call.

After the instruction blocks are located, each instruction block is given a block ID (step 430 of flow diagram 400 in FIG. 4). In the preferred implementation, block ID's are assigned such that the lower numbers are assigned to blocks closer to the beginning of the program, and the higher numbers are assigned to blocks toward the end of the program. This block ID assignment aids graph traversal because the graph entry nodes will generally have lower ID numbers than the graph exit nodes.

After all the block ID's are assigned, a node list is built (step 440). An example of such a list is node list 520 shown in FIG. 5 as being resident in working storage section 150 of memory 120.

Figure 7:
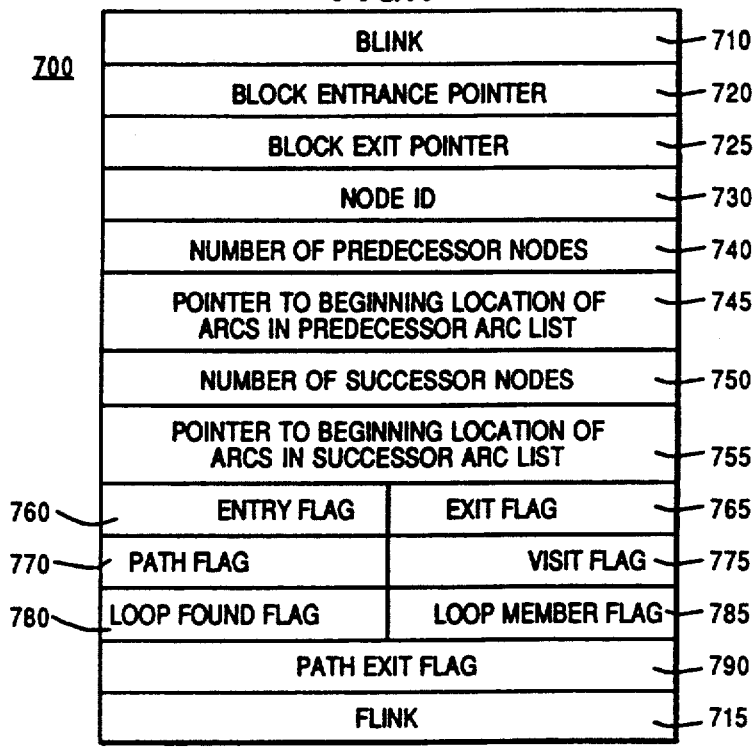
FIG. 7 is a representation of a node list element in accordance with a preferred implementation of the present invention.

FIG. 7 shows an example of a node list element 700 which can be used in accordance with the present invention. Because node list 520 is preferably a linked list, node list element 700 includes a backward pointing link BLINK 710 as well as a forward pointing link FLINK 715. The BLINKs and FLINKs of each of the node list elements form node list 520 into a linked list.

Node list element 700 also preferably includes a block entrance pointer 720 and a block exit pointer 725. Block entrance pointer 720 points to the element in instruction list 510 for the first instruction of the instruction block represented by node list element 700. Similarly, block exit pointer 725 points to the element in instruction list 510 for the last instruction in the block represented by node list element 700.

FIG. 5 shows the relationship of instruction list 510 and node list 520. Node list element 525 is shown as pointing to instruction list elements 512 and 514 in instruction list 510. Elements 512 and 514 correspond to the first and last instruction representations of the block represented by node list element 525. The same relationship is shown between node list element 528 and instruction elements 516 and 518.

Node list element 700 also includes a node ID 730 which is a unique identifier for the block of instructions represented by element 700. Node ID 730 is the unique ID assigned in step 430 of flow diagram 400 in FIG. 4.

In node list element 700 (FIG. 7), fields 740, 745, 750 and 755 define the predecessor and successor nodes for the node represented by node list element 700. The information about the predecessor and successor nodes is contained in a predecessor arc list and a successor arc list, examples of which are predecessor arc list 530 and successor arc list 540 in FIG. 5.

Field 740 contains the number of predecessor nodes to the node represented by node list entry 700, and field 745 points to an element in predecessor arc list 530 which is the first of a consecutive list of predecessor arc list elements.

Figure 8:
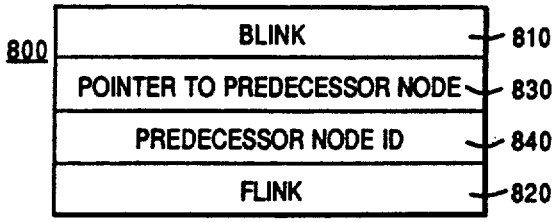
FIG. 8 is a representation of a predecessor arc list element in accordance with a preferred implementation of the present invention.

Like the other lists, predecessor arc list 530 is preferably a linked list. FIG. 8 is an example of a preferred form for a predecessor arc list element 800. Predecessor arc list element 800 includes a backward pointing link BLINK 810 and a forward pointing link FLINK 820, thereby forming predecessor arc list 530 into a linked list. Predecessor arc list entry 800 also includes a predecessor node pointer 830 which locates the node in node list 510 that is the predecessor node corresponding to predecessor arc list element 800.

Predecessor arc list element 800 also includes a predecessor node ID 840 uniquely identifying the node represented by the predecessor arc list element.

FIG. 5 illustrates the relationship between node list 520 and predecessor arc list 530. Node list element 525 points to element 535 in predecessor arc list 530 as the first in an ordered (by node ID) list of predecessor arc list elements, each corresponding to a different predecessor of the node represented by node list element 525. Predecessor arc list element 535 in turn points to element 527 of node list 520. Node list element 527 represents a predecessor of the node represented by node list element 525.

The identification of successor nodes is much like the identification of predecessor nodes. In node list element 700 (FIG. 7), field 750 contains the number of successor nodes for the node represented by node list element 700. Field 755 contains a pointer to the successor arc list element which is the first in a series of successor arc list elements for the successor nodes of the node corresponding to node list element 700. Fields 750 and 755 thus cooperate with successor arc list 540 in the same manner that fields 740 and 745 cooperate with predecessor arc list 530.

Figure 9:
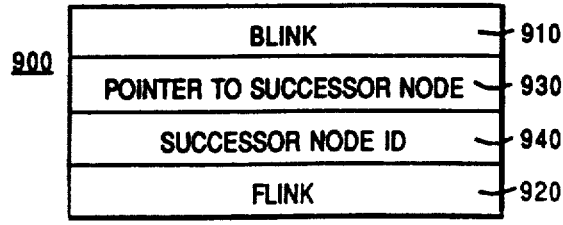
FIG. 9 is a representation of a successor arc list element in accordance with a preferred implementation of the present invention.

Similar to predecessor arc list 530, successor arc list 540 is a linked list. FIG. 9 is an example of a preferred form for a successor arc list element 900. Successor arc list element 900 includes a backward pointing link BLINK 910 and a forward pointing link FLINK 920, thereby forming successor arc list 540 into a linked list.

Successor arc list element 900 also includes two other fields. Pointer 930 locates the element in node list 520 that is the successor node corresponding to successor arc list element 900, and successor node ID 940 contains a unique identifier for successor arc list element 900.

FIG. 5 illustrates the relationship between node list 520 and successor arc list 540. Node list element 525 points to element 545 of successor arc list 540 as the first in ordered list (by node ID) of successor arc list elements each corresponding to a different successor of the node represented by node list element 525. Successor arc list element 545 in turn points to element 528 of node list 520. Node list element 528 thus represents a successor of the node represented by node list element 525.

The remaining fields of node list element 700 (FIG. 7) are flags whose functions will become more apparent from the discussion which follows. Briefly, entry flag 760 is set when the node represented by node list element 700 is an entry node for the source program. Exit flag 765 is set when the node represented by node list element 700 is an exit node for the source program.

Path flag 770 is set when the node represented by node list element 700 is in a path traversed during a path search procedure. Visit flag 775 is set when the node represented by node list element 700 is in a path that need not be searched in a path search procedure. Loop found flag 780 is set when the node represented by node list element 700 is the first node encountered twice during a path search procedure, indicating that a loop has been found. Loop member flag 785 is set if the node represented by node list element 700 is in a loop.

Path exit flag 790 is only used in the working copy of node list 520 for path search and node duplication procedures. Path exit flag 790 is set if exit flag 765 is set or if the node corresponding to node list element 700 is a search exit node during path searching.

As can be appreciated from the discussion of node list element 700, predecessor arc list element 800, and successor arc list element 900, node list 520 is built along with predecessor arc list 530 and successor arc list 540. Thus steps 440 and 450 of the code conversion procedure 400 (FIG. 4) are executed together in the preferred implementation of the invention.

C. GRAPH REDUCTION

After building instruction list 510, node list 520, and arc lists 530 and 540, the source program graph is now formed and described fully by those lists. That graph can now be transformed through reduction and expansion techniques.

Figure 10:
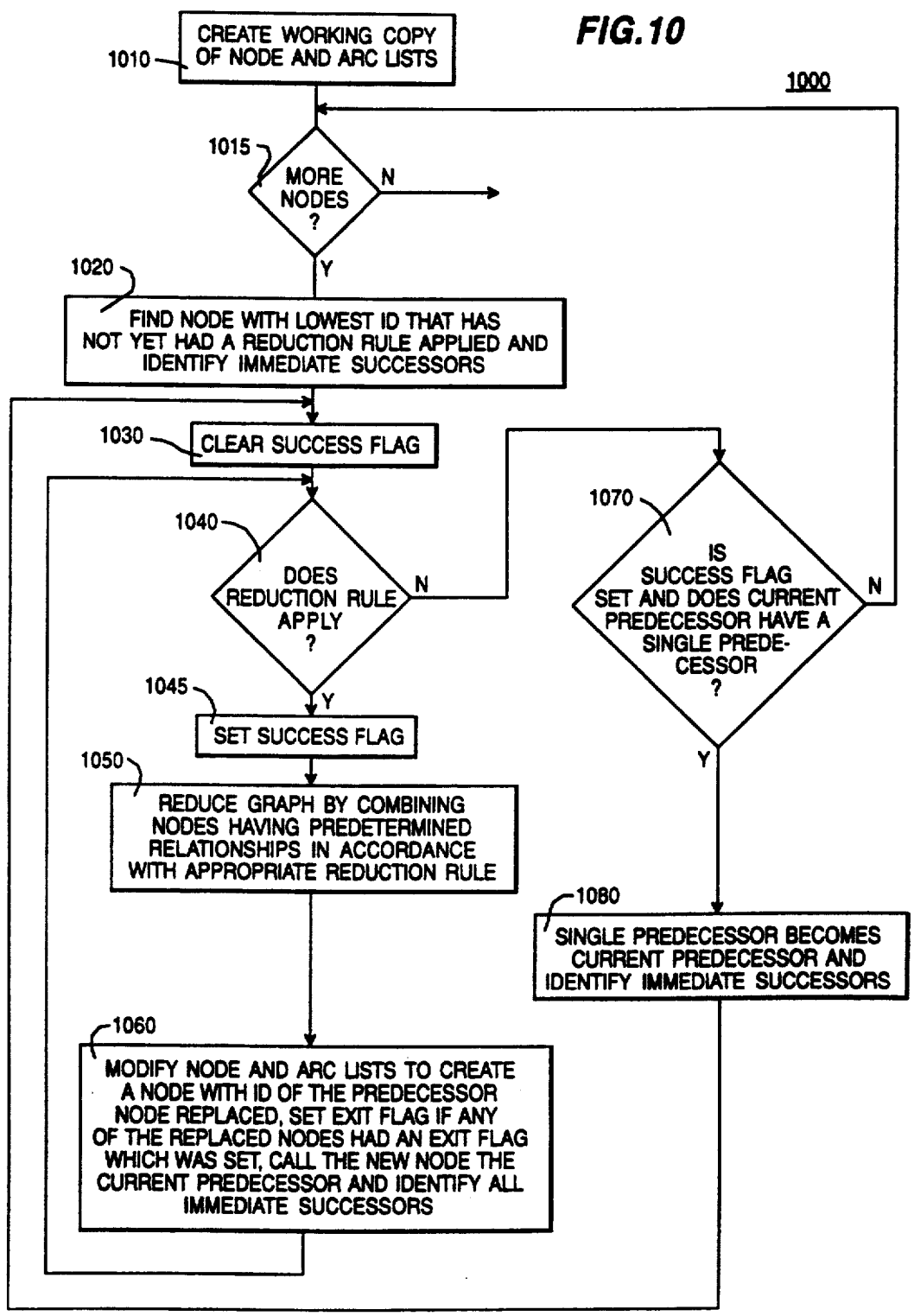
FIG. 10 is a flow diagram of a graph reduction and consolidation procedure in accordance with a preferred implementation of the present invention.

Main control procedure 200 in FIG. 2 shows that the next step to take place is graph reduction (step 220). The preferred implementation of such reduction is shown in FIG. 10 as graph reduction and consolidation procedure 1000.

After the conversion of the source program representation into a graph, working copies of node list 520 and arc lists 530 and 540 are created (step 1010). These working copies are preferably stored in working storage section 150 of memory 120 (see FIG. 1). The working copies are used to preserve a copy of the original graph as reflected in node list 520 and arc lists 530 and 540.

Next, there is an inquiry whether all nodes have been examined (step 1015). If so, graph reduction and consolidation procedure 1000 is completed.

If all the nodes have not been examined, the node with the lowest ID that has not yet been examined to apply a reduction rule is labelled the current predecessor, and all of the immediate successors of the current predecessor are then identified (step 1020). The node with the lowest ID is chosen to effect an order to this procedure. Other techniques are believed to be equally effective.

Next, a success flag for the current predecessor is cleared (step 1030). The success flag is an internal indicator of whether a reduction rule has been applied to the corresponding node.

Each node is then examined to see whether a reduction rule can be applied to that node and its immediate successors to simplify the source program graph (step 1040). Each reduction rule specifies a combination of nodes that can be replaced by a smaller number of nodes. Examples of reduction rules are shown in FIG. 11. These examples are not meant to be comprehensive; different or additional reduction rules can be used as well.

FIG. 11 shows five reduction rules in FIGS. 11(a), 11(b), 11(c), 11(d), and 11(e). Each reduction rule applies if a corresponding relationship between nodes exists.

In the reduction rule shown in FIG. 11(a), node A 1100 and node B 1101 are a predetermined predecessor/successor relationship known as a "SEQUENCE." Two nodes in such a SEQUENCE can reduce to a single node A' 1102, as shown in FIG. 11(a).

FIG. 11(b) shows a reduction rule in which three nodes, node A 1110, node B 1112, and node C 1113, are in an "IF-THEN" relationship. In such a relationship, node A 1110 is a predecessor to node B 1112 and node C 1113, and node B 1112 is also a predecessor to node C 1113. Node A 1110 and node B 1112 can be reduced to a single node A' 1114. This allows the three-node IF-THEN relationship to be reduced to the two node relationship with node A' 1114 and node C 1113. Node A' 1114 and node C 1113 are in a SEQUENCE relationship and can be further reduced to a single node if node C 1113 has no other predecessors.

FIG. 11(c) shows a reduction rule whereby a four-node IF-THEN-ELSE relationship can be reduced. In such a relationship, a node A 1120 is a predecessor node to node B 1121 and node C 1122, both of which are predecessor nodes to a single node D 1123. The three nodes, node A 1120, node B 1121, and node C 1122, which are encircled by the dotted line in FIG. 11(c), can reduce to a single node A' 1124, which is then in a SEQUENCE relationship with node D 1123 if node A' 1124 has no other predecessors.

FIG. 11(d) shows a reduction rule for a multi-node relationship known as a CASE relationship. In a CASE relationship, a node, such as node A 1130, is a single predecessor to several nodes, shown in FIG. 11(d) as node B 1131, node C 1132, and node D 1133, all of which are predecessors to the single node E 1134. Node A 1130 and all of its successor nodes 1031-1033 are encircled by the dotted line shown in FIG. 11(d), and reduce to the single node A' 1135. Node A, is in a SEQUENCE relationship with node E 1134 if node E 1134 has no other predecessors.

FIG. 11(e) shows a reduction rule for a SELF-LOOP relationship. In a SELF-LOOP relationship, a single node, such as node A' 1140, has a path back to itself. Node A 1140 can be replaced with the single node A 1141.

FIG. 12 is presented to illustrate how the reduction rules may be applied. FIG. 12 shows an example of reduction rules applied to a graph 1200 shown in FIG. 12(a). In graph 1200, node A 1201 is a single predecessor node to node B 1202 and node C 1207. Node B 1202 is a single predecessor node to node D 1203, node E 1204, and node F 1205. Node D 1203, node E 1204, and node F 1205 are predecessor nodes to node G 1206, as is node C 1207.

Node B 1202, node D 1203, node E 1204, and node F 1205 are all in the CASE relationship (see FIG. 11(d)). Thus graph 1200 may be reduced by replacing node B 1202, node D 1203, node E 1204, and node F 1205 by the single node B' 1211, as shown in graph 1210 in FIG. 12(b).

Node A 1201, node B, 1211, and node C 1207 in graph 1210 are in the predetermined IF-THEN-ELSE relationship (see FIG. 11(c)). Thus, those nodes may be replaced by the single node A' 1221, thereby reducing graph 1210 in FIG. 12(b) to graph 1220, as shown in FIG. 12(c).

Figure 12A:
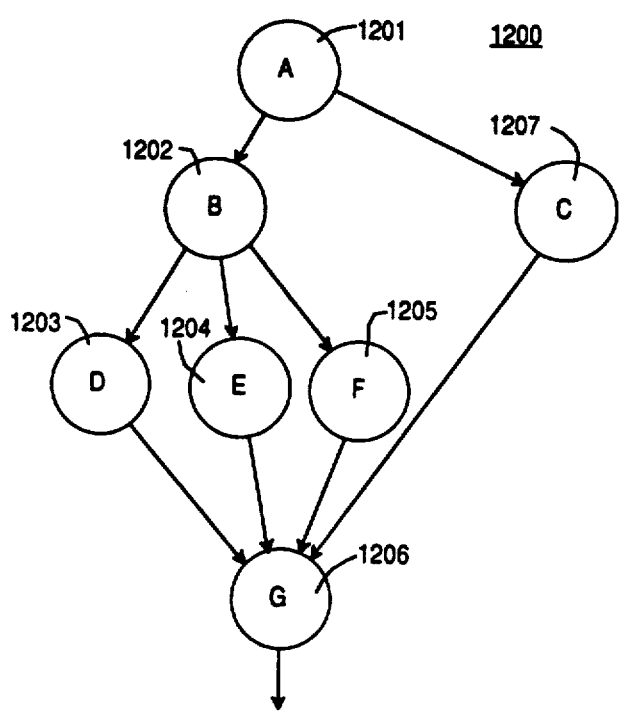
Figure 12B:
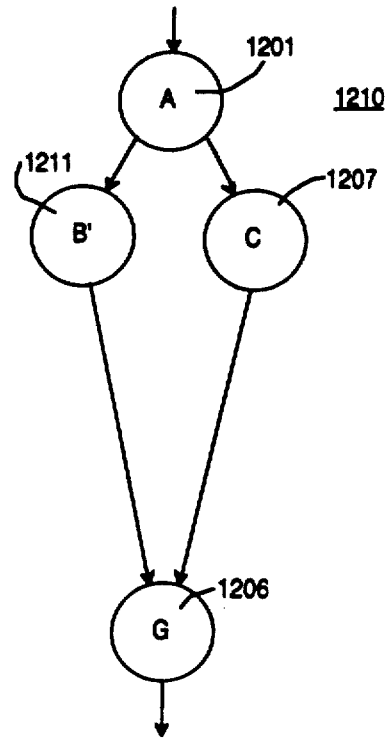
Figure 12C:
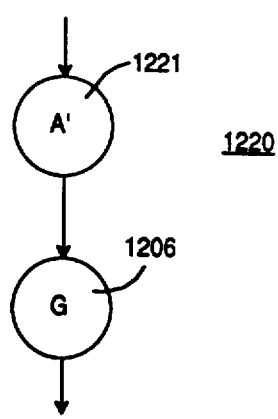

In FIG. 12(c), node A' 1221 and node G 1206 are in the predetermined SEQUENCE relationship (see FIG. 11(a)). Both nodes may be replaced by the single node A" 1231 in graph 1230, as shown in FIG. 12(d).

Figure 12D:
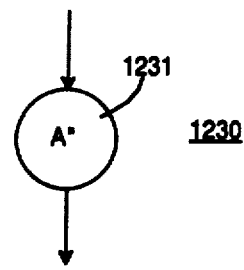

Thus, in three steps, the seven-node graph 1200 in FIG. 12(a) was reduced to the single node graph 1230 shown in FIG. 12(d) through the application of reduction rules.

Returning to the graph reduction and consolidation procedure 1000 in FIG. 10, if one of the reduction rules does apply to the node being examined (steps 1040), then a success flag is set (step 1045), and the graph is reduced by applying that reduction rule to combine nodes (step 1050).

After the graph reduction, the working copy of node list 520 and arc lists 530 and 540 must then be modified (step 1060). In the preferred implementation, this is done by creating a new node in the working copy of the node list. This new node has an ID which is preferably the same as the predecessor node replaced. This allows one to keep track of nodes that have been reduced.

If any of the replaced nodes had an exit flag which was set, the respective exit flag of the new node is also set. It should be noted that the exit flag in the working copy of node list element 700 represents a combined exit flag indicating that at least one of the nodes which was combined to form the new node, either in this step or in a prior step, represented an exit from the source program.

The new node is the predecessor to all immediate successors of any of the nodes replaced. This is accomplished by adjusting the working copy of the successor and predecessor arc lists 530 and 540 to reflect the new node. The arc lists 530 and 540 are also adjusted to eliminate nodes that have been "collapsed" in the reduction step (step 1050) and to eliminate any duplicate entries. In addition, the linking is adjusted so that the successors and predecessors of the new node are consecutive.

Once the working copies of node list 520 and arc lists 530 and 540 are modified, the next inquiry is whether any of the reduction rules now applies to the new node, (step 1040).

The reduction continues until no further reduction rule can be applied to the current predecessor (step 1040). At that point, the inquiry is whether the node being examined has its success flag set and has only one predecessor (step 1070).

If the answer to both questions is true, then that single predecessor becomes the current predecessor, and all of the immediate successors are identified (step 1080). The purpose of this step is to determine whether, after reduction has been applied, the predecessor of the current predecessor can be reduced.

After changing the current predecessors and identifying successors, control is transferred to the step of clearing the success flag (step 1030) so the predecessor of the new node can be examined to see whether any reduction rules apply. The procedure of looking for reduction rules to apply, and applying the rules where appropriate (steps 1040, 1050, and 1060), continues.

If either the success flag was not set or the current predecessor did not have a single predecessor (step 1070), then the presence of additional nodes is checked (step 1015). As long as nodes remain, the procedure 1000 continues.

D. PATH SEARCH

Once the graph reduction and consolidation (step 220 in main control procedure 200, FIG. 2) is finished, the graph is examined to see whether the analysis is complete (step 230). The analysis is complete if all the nodes either have their entry flag set or are in a loop that requires manual analysis.

If the analysis is not complete (step 230), the paths in the graph are examined (step 240). This examination is done to identify loops and graph substructures where the logical program flow converges. The points of convergence of these substructures turn out to be exit nodes in the path searching.

FIG. 13 shows a preferred implementation of a main control loop for path search 1300 which is used for examining the paths of a graph. Loop 1300 begins by clearing all the path flags 770 and visit flags 775 in each of the node list elements 700 of FIG. 7 (step 1310). As explained above, the path flags 770 indicate whether a path containing the corresponding node has been found, and the visit flags 775 are set each time it appears there is no reason to search paths having the corresponding nodes again.

Next, the graph entry and exit nodes are located so they can be used as search entry and exit nodes in the search (step 1320). This is done by examining the entry and exit flags 760 and 765, respectively, of each node list element 700 (FIG. 7).

Selective paths from each search exit node to each search entry node are then found (step 1330). In the search, the paths are preferably traversed in a reverse direction from path exit node to path entry node using arc lists 530 and 540. One reason for searching paths in the reverse direction is because "backing into" loops makes them easier to detect. All nodes with the lowest ID are chosen first. Because entry nodes tend to have lower IDs than exit nodes, this makes finding important paths efficient.

FIG. 14 shows a preferred control state machine 1400 for a path search. The method indicated by state machine 1400 controls selective traversal through the graph to learn about its structure. Certain techniques are employed to simply path searching. For example, for each node whose path flag 770 is set, indicating that there is a found path through the corresponding node, the path flags 770 of those nodes' immediate successors are also set to narrow down the portions of the graph to traverse. In addition, if a node with its path flag 770 set has only one immediate successor with a path flag 770 clear, the path flag 770 for that successor is set because there is no benefit in searching a path to a node with only one successor left.

There are four states in the control state machine 1400. State A 1410 is the "CHOOSE EXIT NODE" state, state B 1420 is the "VISIT PREDECESSOR FROM AN EXIT NODE" state, state C 1430 is the "VISIT PREDECESSOR" state, and state D 1440 is the "VISIT SUCCESSOR" state.

Entry to and exit from control state machine 1400 is via state A 1410. The exit from control state machine 1400 via state A 1410 occurs when every path from all the search exit nodes have either been searched or determined to have no structure requiring analysis.

In state A 1410, one of the search exit nodes is chosen as a current search exit node. This causes state B 1420 to be entered. In state B 1420, a predecessor of the current search exit node is chosen to be visited. All visits are accomplished by use of predecessor arc list 530 or successor arc list 540. The predecessor should have the lowest value ID of any predecessor whose visit flag 775 is clear. If there is no predecessor to visit, control returns to state A 1410 for choice of another search exit node or for exit from state machine 1400.

If, after visiting the predecessor of the exit node in state B 1420, that predecessor is an entry node which only has predecessors with their path flags 770 set, then state D 1440 is entered. In state D 1440, the corresponding path flag 770 and visit flag 775 (FIG. 7) are set in the node list element 700 representing the search entry node, and the path flag 770 is set for each node in the found path. Otherwise, state C 1430 is entered, in part because there may be another search entry node.

In state C 1430, the predecessor with the lowest ID is visited. If the node entered is in the current path, which is known in the preferred implementation from a working linked list structure in working storage section 150 (FIG. 1), then it is deemed the loop found node, and its loop found flag 780 and loop member flag 785 are set (FIG. 700). The path beginning with that node is then traversed, in the opposite (i.e., forward) direction, to the first appearance of that node in the current path, and the loop member flag 785 of each node visited is set. From state C 1430, control is passed to state A 1410 if a loop is detected and the loop found node is the current search exit node.

Control is passed to state D 1440 if one of three conditions are met: there is no predecessor to visit; a search entry node is visited having only predecessors with their path flags set or; a loop is detected and the loop found node is not the current search exit node. If the first condition was met, and there was no predecessor, the visit flag 775 of the node ending this path is set. If the second condition was met, in other words a search entry node was visited which had only predecessors with their path flags 770 set, a path has been found and is recorded, preferably by setting the corresponding path flag 770 and visit flag 775 (FIG. 7) for the search entry node, and by setting the path flag 770 for all the nodes visited between and including the current path search exit and entry nodes.

If control is in state C 1430 and none of the conditions indicated above occurs, then control remains in state C 1430 and the next predecessor is visited. One reason for this step is that there may be another search entry node.

When control state machine 1400 is in state D 1440, the successor of the current node in the current path is visited. Control is passed to state B 1420 if the successor node in the current path is the current search exit node. Control is passed to state C 1430 if the successor node has a predecessor that has a clear visit flag 775, and does not have its loop found flag 780 set. If none of these conditions is met, control remains in state D 1440 and the next successor is visited. In this last condition, when the next successor is a current search entry node, a path is found. The path flag 770 and visit flag 775 of the search entry node are thus set along with the path flags 770 for all of the nodes visited between and including the current search exit node and current search entry node.

When the paths from each search exit node have been visited, path search (step 1330 of main control loop 1300 in FIG. 13) is complete. As explained above, while in control state machine 1400, the path flags 770 were set for node elements 700 representing nodes encountered in a found path between the search entry and exit nodes (step 1340).

In addition, for each node with a path flag that is set, its successor also has its path flag set (step 1350). This is because, as explained above, there is no benefit from searching such paths.

Next, an examination of the graph is made to see whether there exist any nodes which have a path flag that is set and which also have only one successor with a path flag that is clear (step 1360). If so, the path flags for those single successor nodes are set (step 1370) for the reasons explained above, and the inquiry is repeated.

When all the nodes with path flags that are set also have no single successor nodes with path flags that are clear (step 1360), an inquiry is made to see whether any nodes exist with a clear path flag (step 1380). If not, the main control loop for the path search 1300 is completed.

If there are still nodes which have a path flag that is clear, then the path search (step 1330) must be continued with new search entry and exit nodes set as path entry and exit nodes, respectively (step 1390).

Preferably, the path entry nodes are selected as nodes which do not have their path flag set but which have a predecessor node that has its path flag set. Choosing path entry nodes whose predecessors have path flags set ensures that there is a part of the graph prior to this node which has already been searched.

Preferably, path exit nodes are selected as nodes which have their path flags set and which have predecessors whose path flag is not set. Choosing path exit nodes whose predecessors have path flags not set ensures that there is a part of the graph from this node which has not been searched. If a node is chosen as a path search exit node, a notation is made in path exit flag 790 in the working copy of the corresponding node list element 700. Once the new search entry and exit nodes are chosen, the loop beginning with the search for paths in step 1330 is repeated.

E. NODE DUPLICATION

When the path examination is completed (step 240 in main control procedure 200 shown in FIG. 2), initial loop analysis (step 250) takes place if the alternate implementation is used. Loop analysis is discussed below in Section G.

After loop analysis is performed and graph reduction is repeated (step 250), a determination is made to see whether the graph analysis is complete (step 260). If not, the graph "manipulation" takes place (step 270). Graph manipulation includes the selection of nodes for duplication, the expansion of the graph, and reduction of the expanded graph. A preferred implementation of a graph manipulation loop 1500, which also includes reduction of the expanded graph, is shown in FIG. 15.

In graph manipulation loop 1500, the first step is to identify the initial set of nodes for duplication (step 1510). FIG. 16 contains a flow diagram of a preferred procedure for identifying the initial set of nodes for duplication 1600.

The first question asked in procedure 1600 is whether the current node has multiple predecessors and a single successor (step 1610). If not, then the current node is not selected for duplication.

If the current node does have multiple predecessors and a single successor, the next question is whether that node has a loop member flag that is set (step 1620). A set loop member flag indicates that this node is in a loop found by the path search. If so, the current node is not selected for duplication.

If the node is not in a found loop, the next inquiry is whether the current node has a predecessor node with its loop member flag set (step 1630). If the current node does have a predecessor node with a loop member flag set, then that node is not selected for duplication.

Otherwise, the next inquiry is whether the current node has been an exit node for the path search algorithm (step 1640). This can be determined by examining the path exit flag 790 for the node ID list member corresponding to the current node. If that path exit flag 790 is not set, the node is identified for duplication (step 1650).

Otherwise the corresponding node is not selected for duplication. This is because, as indicated above, such nodes represent convergence points of the substructures of the graph. It has been found that, these nodes should not be duplicated initially because such duplication does not further ultimate graph reduction.

After node testing and duplication, if appropriate, an inquiry is made to see whether there are any other nodes to be examined (step 1660). If so, then the process iterates beginning with step 1610.

After the initial set of nodes are identified for duplication, this set is examined for predecessor/successor relationships (step 1670). Eliminated as candidates for duplication are any nodes that are immediate successors of other candidates for duplication. This may result in less duplication, but has been found to promote efficient graph manipulation by eliminating unnecessary expansions.

The result of procedure 1600 is the identification of nodes that are candidates for duplication which have multiple predecessors and a single successor, which were not search exit nodes during the path search, do not have their loop member flag set, and do not have a predecessor with a loop member flag set.

After identifying the initial set of nodes for duplication, the nodes in the resulting set are duplicated (step 1520). A preferred implementation of such duplication is shown by the node duplication loop 1700 in FIG. 17.

The first step of the node duplication loop 1700 is to make a number of copies of the node list element 700 (See FIG. 7) for the node identified for duplication so that there is one copy for each predecessor of the node being copied (step 1710). These copies are also preferably stored in working section 150 of memory 120 (see FIG. 1).

Each copy of the node list element for the node identified for duplication is then modified so that it is a successor of a corresponding predecessor node (step 1720). This change effectively expands the graph represented by node list 520 so that the node identified for duplication is replaced by several nodes, each having a single predecessor.

The predecessor arc list 530 and the successor arc list 540 are then updated to reflect the duplicated nodes (step 1730). This change requires modifying pointer 930 of successor arc list element 900 (FIG. 9) for the corresponding predecessor node, and pointer 830 of predecessor arc list element 800 (FIG. 8) for the corresponding successor node of each of the newly-created nodes. The change also requires corresponding changes to pointers 745 and 755 as well as to numbers 740 and 750 of the node list element 700 (FIG. 7) for that node.

After all the lists are updated and corrected, an inquiry is made to see whether any nodes remain to be duplicated (step 1740). If so, the procedure beginning with the copying of the next node identified for duplication (step 1710) is repeated. Otherwise, node duplication process 1700 is completed.

In graph manipulation loop 1500 shown in FIG. 15, after the nodes in the initial set are duplicated to form a modified graph (step 1520), that modified graph is then reduced (step 1530). Preferably, the reduction of the modified graph uses the same graph reduction and consolidation process as step 220 in FIG. 2.

After reduction of the modified graph, an inquiry is made to determine whether any nodes remain to be duplicated (step 1540). If not, graph manipulation loop 1500 is complete.

Otherwise a subsequent set of nodes is identified for duplication (step 1550). The identification of the subsequent set of nodes for duplication is preferably implemented using procedure 1800 shown in FIG. 18.

Compared to procedure 1600, procedure 1800 has much less stringent criteria for node duplication. Because of the similarities of procedures 1800 and 1600, the description of procedure 1800 will be brief and rely on the prior description of procedure 1600. In procedure 1800, a node will be identified for duplication (step 1820) if it has multiple predecessors and a single successor node (step 1810). Otherwise, the node is not identified for duplication. The inquiry in step 1810 is repeated for all nodes to be analyzed (step 1830).

Afterwards some candidates for duplication are eliminated (step 1840) for the same reasons used in step 1670 in procedure 1600 (FIG. 16).

Returning to the graph manipulation loop 1500 in FIG. 15, once a subsequent set of candidates for duplication has been identified (step 1550), the nodes in the subsequent set are duplicated (step 1520), and the resulting modified graph is again reduced (step 1530). Such reduction also preferably uses the graph reduction and consolidation in step 220 of FIG. 2. This process continues until no more nodes remain (step 1540).

F. COMPLETION

Returning to main control procedure 200, the completion of graph manipulation step 270 signals the need for a determination whether the analysis of the graph is complete (step 280). As in steps 230 and 260, analysis is complete when every node in the modified graph is either a graph entry point or is in a loop to be analyzed manually (if loop analysis was not performed or was performed but unable to reduce all loops). If analysis is not complete, the final loop analysis may be performed (step 285).

When the analysis is complete, the result is a graph that is either ill-formed and requires manual repair, or is in fully reduced form. In such a form, the graph may be converted into a high level language.

G. LOOP ANALYSIS

As indicated above, there may be occasion to perform initial loop analysis of certain loops in the resulting graph to replace those loops with single nodes, and thereby make the graph reduction a much easier process. An example of a routine for such loop analysis is shown by the loop analysis procedure 1900 in FIG. 19.

In the loop analysis procedure 1900, the first step is to determine the loop partitions from the loops found during path research (step 1910). Loop partitions, which may contain more than one loop, are used to reduce the loops in the graph.

A well-formed loop partition is a collection of nodes in one or more loops such that there is one node, called a header that has predecessors not in the loop partition, as well as loop exit nodes that share common successors not in the loop partition. These exit nodes are called "predicates."

FIG. 20 shows a loop partition determination procedure 2000 for finding the loop partitions. In loop partition determination procedure 2000, an initial loop partition is created for each loop set found during path searching (step 2010). A loop set consists of a node having its loop found flag 780 (see node list element 700 in FIG. 7) set and includes all of the nodes with their loop member flag 785 set for that node with its loop found node flag set.

Next, the initial loop partitions are examined to see whether any two intersect (step 2020). Loop partitions intersect if they share at least one node. If two loop partitions intersect, they are combined into a single loop partition (step 2030).

Next, for each loop partition, the predecessors and successors of each node in that loop partition are listed. If there is some node which is not in the loop partition, but which is both a predecessor of one node in the loop partition and a successor of another node in the loop partition (step 2040), then that node is added to that loop partition (step 2050). If the addition of such nodes to the loop partition causes loop partition intersections, the intersecting loop partitions are again combined and the search is repeated for nodes which are not in loop partitions but are predecessors and successors to nodes in the loop partition (step 2030). If there are no nodes which are not in a loop partition and are both a predecessor and a successor to a node in a partition, loop partition determination procedure 2000 is completed (step 2040).

The completion of loop partition determination procedure 2000 also completes the first step in loop analysis procedure 1900. After the identification of loop partitions, any loop partition that is well-formed is reduced to a single node (step 1920). As explained above, a well-formed loop partition has only one header and all loop predicates share the same successor.

Final loop analysis (step 285 in FIG. 2) resembles initial loop analysis, and also reports ill-formed loop structures requiring manual repair.

H. CONCLUSION

This invention provides an efficient and advanced mechanism for placing programs into a form which allows for automatic conversion to different languages. As explained above, this invention requires only minimal human intervention, such as when ill-formed loops are present. This invention also accommodates difficult structures such as loops and GOTO statements in a machine language program, and removes these and other undesirable code structures from the translated program.

This invention is performed automatically, and can therefore be used in translating libraries of programs from one language to another.

What is claimed is:

1. A method of automatically transforming an initial program flow representation of a computer program into a modified program flow representation, the computer program containing sequentially-ordered blocks of consecutive instructions written in a first computer language, and the initial program flow representation including a plurality of nodes each representing a different one of the blocks of instructions, wherein the nodes in the initial program flow representation are connected in paths reflective of the possible sequences which the blocks of instructions may be executed in accordance with the computer program, and wherein the connection, in any of the paths, of a first one of the nodes representing a first block of instructions to a second one of the nodes representing a second block of instructions to reflect the execution in the computer program of the first block of instructions immediately prior to the execution of the second block of instructions makes the first node a predecessor node of the second node and the second node a successor node of the first node, the method comprising the steps, performed by a computer, of:

examining the paths in the initial program flow representation to identify the ones of the nodes which are members of loops and the ones of the nodes which are path search exit nodes, loops including ones of the paths that reflect sequences of repetitive instruction block execution, and the ones of the nodes lying in the paths in loops being deemed members of a loop, and path search exit nodes being the ones of the nodes which occur at the exit of a control substructure in the program flow representation and in the modified program flow representation;

selecting the ones of the nodes which have multiple predecessor nodes and a single successor node, which are not loop members or successor nodes of loop members, and which are not path search exit nodes;

replicating selected ones of the selected nodes such that a different copy of each selected node is formed to correspond to each predecessor node of that selected node;

replacing each of the selected nodes in the initial program flow representation with the copies of that selected node; and connecting each of the copies of each of the selected nodes to the single successor node and to the predecessor node corresponding to that selected node, the replication of selected ones of the selected nodes and the connection of the copies forming a modified program flow representation.

2. The method of claim 1 wherein the step of replicating selected ones of the selected nodes includes the substep of choosing as the selected ones of the selected nodes only the ones of the selected nodes which are not successor nodes to other ones of the selected nodes.

3. The method of claim 1 further including the step of reducing the initial program flow representation by combining nodes having predetermined relationships.

4. The method of claim 3 wherein the reducing step occurs prior to the selection of nodes to be replicated.

5. The method of claim 4 further including the step of reducing the modified program flow representation by combining nodes having predetermined relationships.

6. The method of claim 5 further including the steps, executed after the step of reducing the modified program flow representation, of selecting additional ones of the nodes in the modified program flow representation which have multiple predecessor nodes and a single successor node;

replicating selected ones of the selected additional nodes such that a different copy of each selected additional node is formed to correspond to each predecessor node of that selected additional node;

replacing each of the selected additional nodes in the modified program flow representation with the copies of that selected additional node; and connecting each of the copies of each selected additional node to the predecessor node and the single successor node corresponding to that selected additional node, the replicating, replacing and connecting of the selected ones of the selected additional nodes thereby forming a new modified program flow representation.

7. The method of claim 6 wherein the selecting step also includes the substep of choosing as the selected ones of the selected nodes only the ones of the selected nodes which are not successor nodes to other ones of the selected nodes.

8. The method of claim 6 further including the step of reducing the new modified program flow representation by combining nodes having the predetermined relationships.

9. The method of claim 1 further including the step of reducing the modified program flow representation by combining nodes having predetermined relationships.

10. The method of claim 1 wherein the step of examining the paths in the initial program flow representation includes the substeps of locating graph entry nodes of the program flow representation as the nodes representing the blocks of instructions that are executed at the beginning of the computer program;

locating graph exit nodes of the program flow representation as the nodes representing the blocks of instructions that are executed at the end of the computer program, the graph exit nodes also being included as the path search exit nodes; and identifying as a path member selected ones of the nodes in the paths between the graph entry nodes and the graph exit nodes in the initial program flow representation.

11. The method of claim 10 wherein the step of identifying as a path member the selected ones of the nodes in the paths between the graph entry nodes and the graph exit nodes in the initial program flow representation includes the substep of traversing the paths from the corresponding one of the graph exit nodes to the corresponding one of the graph entry nodes.

12. The method of claim 10 wherein the step of identifying the path members also includes the substep of identifying the loop members.

13. The method of claim 10 wherein the step of examining the paths in the initial program flow representation also includes the substeps of locating path entry nodes in the program flow representation by finding ones of the nodes which are not one of the path members but for which one of the predecessor nodes is one of the path members;

locating path exit nodes of the program flow representation by finding ones of the nodes which are ones of the path members but for which one of the predecessor nodes is not one of the path members, the path exit nodes also being included as the path search exit nodes; and identifying as a path member selected ones of the nodes in the paths from the path entry nodes to the path exit nodes in the initial program flow representation.

14. The method of claim 13 wherein the step of examining the paths in the initial program flow representation also includes the substep of repeating the steps of locating path entry nodes, locating path exit nodes, and identifying as path members each node in the paths from the path entry nodes to the path exit nodes in the initial program flow representation, until all of the nodes in the initial program flow representation are path members.

15. The method of claim 13 wherein the step of identifying as a path member the selected ones of the nodes in the paths from each of the path entry nodes to each of the path exit nodes in the initial program flow representation includes the substep of traversing the paths from corresponding ones of the path exit nodes to corresponding ones of the path entry nodes.

16. The method of claim 13 wherein the step of identifying as a path member the selected ones of the nodes in the paths from the path entry nodes to the path exit nodes in the initial program flow representation also includes the substep of identifying the loop members.

17. The method of claim 1 further including the step of repeating the steps of selecting nodes, replicating selected nodes, replacing nodes with copies, and connecting the copies of the selected nodes until the modified program flow representation is in a fully reduced condition.

18. The method of claim 5 further including the step of repeating the steps of selecting nodes, replicating selected nodes, replacing nodes with copies, and connecting the copies of the selected nodes until the modified program flow representation is in a fully reduced condition.

19. The method of claim 1 further including the step of representing the initial and modified program flow representations in a memory of the data processor as a node list and arc lists, wherein the node list includes a plurality of elements each representing a different one of the nodes, and wherein the arc lists include a plurality of elements each representing a different one of the predecessor node or successor node relationships.

20. The method of claim 1 further including the steps of performing an initial analysis of loops in the initial program flow representation; and reducing the initial flow representation for selected ones of the loops in the initial flow representation.

21. The method of claim 20 further including the step of performing a final analysis of loops in the modified program flow representation.

22. A method of automatically transforming an initial program flow representation of a computer program into a modified program flow representation, the computer program containing sequentially-ordered blocks of consecutive instructions written in a first computer language, and the initial program flow representation including a plurality of nodes each representing a different one of the blocks of instructions, wherein the nodes in the initial program flow representation are connected in paths reflective of the possible sequences which the blocks of instructions may be executed in accordance with the computer program, and wherein the connection, in any of the paths, of a first one of the nodes representing a first block of instructions to a second one of the nodes representing a second block of instructions to reflect the execution in the computer program of the first block of instructions immediately prior to the execution of the second block of instructions makes the first node a predecessor node of the second node and the second node a successor node of the first node, the method comprising the steps, performed by a computer, of:

- creating an instruction list containing a representation of the instructions in the blocks of consecutive instructions;
- creating a node list containing information about each of the nodes and identifying the corresponding block of instructions by reference to the instruction list;
- creating arc lists containing information about the paths in the initial program flow representation;
- examining the paths in the initial program flow representation to identify the ones of the nodes which are members of loops and the ones of the nodes which are path search exit nodes,
  - loops including ones of the paths that reflect sequences of repetitive instruction block execution, and the ones of the nodes lying in the paths in loops being deemed members of a loop, and
  - path search exit nodes being the ones of the nodes which occur at the exit of a control substructure in the program flow representation and in the modified program flow representation;
- setting a loop member flag in the corresponding entry of the node list for those of the nodes which are loop members;
- setting a path exit flag in the corresponding entry of the node list for those of the nodes which are path search exit nodes;
- examining the node list to select the ones of the nodes which have multiple predecessor nodes and a single successor node, for which the loop member flag is not set and for which the predecessor node does not have its loop member flag set, and for which the path exit flag is not set;
- replicating each of the node list entries for selected ones of the selected nodes such that a different copy of each of the node list entries for a corresponding one of the selected nodes is formed for each predecessor node of the corresponding selected node;
- replacing each of the selected nodes in the initial program flow representation with the copies of that selected node by adding the replicated node list entries to the node list; and
- connecting each replicated node list entry to a corresponding entry in the arc lists such that the nodes corresponding to the replicated node list entries are connected to the single successor node and to the corresponding predecessor node, the replication of the node list entries and their connection to the arc list entries forming the modified program flow representation.

23. The method of claim 22 wherein the step of examining the paths includes the step of
setting a loop found flag in the corresponding entry of the node list for those of the nodes which are the first ones of the nodes discovered in the loops.

24. The method of claim 22 wherein the replicating step also includes the substep of
choosing as the selected ones of the selected nodes only the ones of the selected nodes which are not successor nodes to other ones of the selected nodes.

25. The method of claim 22 wherein the step of creating the instruction list includes the substeps of
creating the instruction list as a linked list of instruction list elements.

26. The method of claim 22 wherein the step of creating the node list includes the substeps of
creating the node list as a list of node list elements, each of the elements representing a different one of the blocks of instructions;
placing in each of the node list elements a pointer to the instruction list to identify the corresponding block of instructions; and
placing in each of the node list elements a unique identifier.

27. The method of claim 26 wherein the step of creating the node list further includes the substep of
placing into each of the node list elements the loop member flag and the path exit flag.

28. The method of claim 26 wherein the step of creating a node list further includes the substep of
placing into each of the node list elements a pointer to the arc lists to identify the predecessor nodes and successor nodes to the corresponding node.

29. The method of claim 22 wherein the step of creating the arc lists includes the substeps of
creating a predecessor arc list as a plurality of predecessor list elements each having pointers to the node list to identify the predecessor nodes of a corresponding node; and
creating a successor arc list as a plurality of successor list elements each having pointers to the node list to identify the successor nodes of a corresponding node.

30. The method of claim 29 wherein the step of creating the node list includes the substeps of
creating the node list as a list of node list elements, each of the elements representing a different one of the blocks of instructions;
placing in each of the node list elements a pointer to the instruction list to identify the corresponding block of instructions; and
placing in each of the node list elements a unique identifier such that the closer the corresponding block of instructions is to the beginning of the computer program, the lower the value of the unique identifier.

31. The method of claim 30 wherein the step of creating a node list further includes the substeps of
placing into each of the node list elements a pointer to the predecessor arc list to identify a predecessor element corresponding to a first one of the predecessor nodes for the node corresponding to that node list element;
placing into each of the node list elements an indicator of the number of predecessor nodes for the node corresponding to that node list element;
placing into each of the node list elements a pointer to the successor arc list to identify a successor element corresponding to a first one of the successor nodes for the node corresponding to that node list element; and placing into each of the node list elements an indicator of the number of successor nodes for the node corresponding to that node list element.

32. The method of claim 31 further including the step of reducing the initial program flow representation by combining nodes having predetermined relationships.

33. The method of claim 32 wherein the step of reducing the initial program flow representation includes the substeps of modifying the node list elements for the predecessor ones of the nodes in the predetermined relationships to include information from the successor ones of the nodes in the predetermined relationships;

removing the node list elements for the successor ones of the nodes in the predetermined relationships; and creating as the pointer to the successor list element for each predecessor one of the nodes in the predetermined relationships new node list element, a pointer which identifies the successor nodes of all the nodes whose node list elements were removed.

34. The method of claim 31 wherein the step of examining the paths in the initial program flow representation includes the substeps of locating graph entry nodes of the program flow representation as the nodes representing the blocks of instructions that are executed at the beginning of the computer program;

locating graph exit nodes of the program flow representation as the nodes representing the blocks of instructions that are executed at the end of the computer program;

setting the path exit flags for the graph exit nodes; and identifying as a path member the ones of the nodes in the paths between the graph entry nodes and the graph exit nodes in the initial program flow representation.

35. The method of claim 34 wherein the step of examining the paths in the initial program flow representation also includes the substeps of locating path entry nodes in the program flow representation by finding ones of the nodes which are not one of the path members but for which one of the predecessor nodes is one of the path members;

locating path exit nodes of the program flow representation by finding ones of the nodes which are ones of the path members but for which one of the predecessor nodes is not one of the path members, the path exit nodes also being included as the path search exit nodes;

setting the path exit flags for the path exit nodes; and identifying as a path member the ones of the nodes in the paths from the path entry nodes to the path exit nodes in the initial program flow representation.

36. The method of claim 31 wherein the step of replicating each of the node list entries includes the steps of setting, in the copies of the node list entries for each selected node, the pointer to the instruction list to the same value; and setting, in the copies of the node list entries for each selected node, the pointer to the predecessor arc list to a location in the predecessor arc list corresponding to a different one of the predecessors of that selected node.

37. A method of automatically preparing a first computer program written in a first computer language and containing sequentially-ordered blocks of consecutive instructions for translation into a second computer program written in a second computer language, the method comprising the steps, performed by a computer, of:

converting the first program into an initial program flow representation including a plurality of nodes each representing a different one of the blocks of instructions, the nodes being connected in paths reflective of the possible sequences which the blocks of instructions in the program may be executed in accordance with the first computer program, and the connection in any of the paths of a first one of the nodes representing a first block of instructions to a second one of the nodes representing a second block of instructions to reflect the execution in the first computer program of the first block of instructions immediately prior to the execution of the second block of instructions makes the first node a predecessor node of the second node and the second node a successor node of the first nodes;

examining the paths in the initial program flow representation to identify the ones of the nodes which are members of loops and the ones of the nodes which are path search exit nodes, loops including ones of the paths that reflect sequences of repetitive instruction block execution, and the ones of the nodes lying in the paths in loops being deemed members of a loop, and path search exit nodes being the ones of the nodes which occur at the exit of a control substructure in the program flow representation and in the modified program flow representation;

selecting the ones of the nodes which have multiple predecessor nodes and a single successor node, which are not loop members, which have no predecessors that are loop members, and which are not path search exit nodes;

replicating selected ones of the selected nodes such that a different copy of each selected node is formed to correspond to each predecessor node of that selected node;

replacing each of the selected nodes in the initial program flow representation with the copies of that selected node; and connecting each of the copies of each of the selected nodes to the predecessor node corresponding to that selected node and to the single successor node of that selected node, the replication of selected nodes and the connection of the copies thereby forming a modified program flow representation for use in generating the second computer program written in the second computer language.

38. The method of claim 37 wherein the replicating step also includes the substep of choosing as the selected ones of the selected nodes only the ones of the selected nodes which are not successor nodes to other ones of the selected nodes.

39. The method of claim 37 further including the step of reducing the initial program flow representation by combining nodes having predetermined relationships.

40. The method of claim 39 wherein the reducing step occurs prior to the selection of nodes to be replicated.

41. The method of claim 40 further including the step of reducing the modified program flow representation by combining nodes having predetermined relationships.

42. The method of claim 37 wherein the step of examining the paths in the initial program flow representation includes the substeps of locating graph entry nodes of the program flow representation as the nodes representing the blocks of instructions that are executed at the beginning of the computer program;

locating graph exit nodes of the program flow representation as the nodes representing the blocks of instructions that are executed at the end of the computer program, the graph exit nodes being included as path search exit nodes; and identifying as a path member selected ones of the nodes in the paths between the graph entry nodes and the graph exit nodes in the initial program flow representation.

43. The method of claim 42 wherein the step of examining the paths in the initial program flow representation also includes the substeps of locating path entry nodes in the program flow representation by finding ones of the nodes which are not path members but for which one of the predecessor nodes is one of the path members;

locating path exit nodes of the program flow representation by finding ones of the nodes which are path members but for which one of the predecessor nodes is not one of the path members, the path exit nodes also being included as the path search exit nodes; and identifying as a path member the selected ones of the nodes in the paths between the path entry nodes and the path exit nodes in the initial program flow representation.

44. A data processor system for transforming an initial program flow representation of a computer program into a modified program flow representation, the computer program containing sequentially-ordered blocks of consecutive instructions written in a first computer language, and the initial program flow representation including a plurality of nodes each representing a different one of the blocks of instructions, wherein the nodes in the initial program flow representation are connected in paths reflective of the possible sequences which the blocks of instructions may be executed in accordance with the computer program, and wherein the connection, in any of the paths, of a first one of the nodes representing a first block of instructions to a second one of the nodes representing a second block of instructions to reflect the execution in the computer program of the first block of instructions immediately prior to the execution of the second block of instructions makes the first node a predecessor node of the second node and the second node a successor node of the first node, the data processor comprising:

a memory system for storing the computer program, the initial program flow representation, and the modified program flow representation, the memory system including an instruction list containing the instructions in the blocks of consecutive instructions, a node list containing information about each of the nodes and identifying the corresponding block of instructions by reference to the instruction list, and arc lists containing information about the paths of the initial program flow representation;

means, coupled to the memory system, for examining the paths in the initial program flow representation using the arc and node lists to identify the ones of the nodes which are members of loops and which are path search exit nodes, loops including ones of the paths that reflect sequences of repetitive instruction block execution, and the ones of the nodes lying in the paths in loops being deemed members of a loop, and path search exit nodes being the ones of the nodes which occur at the exit of a control substructure in the program flow representation and in the modified program flow representation;

means, coupled to the memory system, for setting a loop found flag in the corresponding entry of the node list for those of the nodes which are the first loop members encountered during path examination;

means, coupled to the memory system, for examining the node list to select the ones of the nodes which have multiple predecessor nodes and a single successor node, which have no predecessor with its loop member flag set, and for which neither the loop member flag nor path exit flag is set;

means, coupled to the memory system, for replicating each of the node list entries for the selected nodes such that a different copy of each of the node list entries is formed for each predecessor node of the corresponding node, and for replacing each of the selected nodes in the initial program flow representation with the copies of that selected node by adding the replicated node list entries to the node list; and means, coupled to the memory system, for connecting each replicated node list entry to a corresponding entry in the arc lists such that the nodes corresponding to the replicated node list entries are connected to the corresponding single predecessor node and single successor node, the replication of the node list entries and their connection to the arc list entries forming the modified program flow representation.

45. The data processing system of claim 44 wherein the means for replicating includes means for choosing as the selected ones of the selected nodes only the ones of the selected nodes which are not successor nodes to other ones of the selected nodes.

46. The data processing system of claim 44 wherein instruction list includes linking pointer means for connecting the instruction list as a linked list of instruction list elements.

47. The data processing system of claim 44 wherein the node list includes a list of node list elements, each of the elements representing a different one of the blocks of instructions;

a pointer to the instruction list in each of the node list elements to identify the corresponding block of instructions; and a unique identifier in each of the node list elements.

48. The data processing system of claim 47 wherein the node list elements include the loop member flag and the path exit flag.

49. The data processing system of claim 47 wherein the node list elements include
- a pointer to the arc lists to identify the predecessor nodes and successor nodes to the corresponding node.

50. The data processing system of claim 44 wherein the arc lists include
- a predecessor arc list containing a plurality of predecessor list elements each having pointers to the node list to identify the predecessor nodes of a corresponding node; and
- a successor arc list containing a plurality of successor list elements each having pointers to the node list to identify the successor nodes of a corresponding node.

51. The data processing system of claim 50 wherein the node list includes
- a list of node list elements, each of the elements representing a different one of the blocks of instructions, and wherein each of the node list elements includes
- a pointer to the instruction list to identify the corresponding block of instructions; and
- a unique identifier assigned such that the closer the corresponding block of instructions is to the beginning of the computer program, the lower the value of the unique identifier.

52. The data processing system of claim 51 wherein the node list elements each include
- a pointer to the predecessor arc list to identify a predecessor element corresponding to a first one of the predecessor nodes for the node corresponding to that node list element;
- an indicator of the number of predecessor nodes for the node corresponding to that node list element;
- a pointer to the successor arc list to identify a successor element corresponding to a first one of the successor nodes for the node corresponding to that node list element; and
- an indicator of the number of successor nodes for the node corresponding to that node list element.

53. The data processing system of claim 52 further including
- means, coupled to the memory system, for reducing the initial program flow representation by combining nodes having predetermined relationships.

54. The data processing system of claim 53 wherein the means for reducing the initial program flow representation includes
- means, coupled to the memory system, for modifying the node list elements for the predecessor ones of the nodes in the predetermined relationships to include information from the successor ones of the nodes in the predetermined relationships;
- means, coupled to the memory system, for removing the node list elements for the successor ones of the nodes in the predetermined relationships; and
- means, coupled to the memory system, for creating as the pointer to the successor list element for the predecessor ones of the nodes in the predetermined relationships, a pointer which identifies the successor nodes of all the predecessor nodes corresponding to the modified node list elements.

55. The data processing system of claim 52 wherein the means for examining the paths in the initial program flow representation includes
- means, coupled to the memory system, for locating graph entry nodes of the program flow representation as the nodes representing the blocks of instructions that are executed at the beginning of the computer program;
- means, coupled to the memory system, for locating graph exit nodes of the program flow representation as the nodes representing the blocks of instructions that are executed at the end of the computer program,
- means, coupled to the memory system, for setting the path exit flags for the graph exit nodes; and
- means, coupled to the memory system, for identifying as a path member selected ones of the nodes in the paths between the graph entry nodes and the graph exit nodes in the initial program flow representation.

56. A method of automatically transforming an initial program flow representation of a computer program into a modified program flow representation, the computer program containing sequentially-ordered blocks of consecutive instructions written in a first computer language, and the initial program flow representation including a plurality of nodes each representing a different one of the blocks of instructions, wherein the nodes in the initial program flow representation are connected in paths reflective of the possible sequences which the blocks of instructions may be executed in accordance with the computer program, and wherein the connection, in any of the paths, of a first one of the nodes representing a first block of instructions to a second one of the nodes representing a second block of instructions to reflect the execution in the computer program of the first block of instructions immediately prior to the execution of the second block of instructions makes the first node a predecessor node of the second node and the second node a successor node of the first node, the method comprising the steps, performed by a computer of:
- examining the paths in the initial program flow representation to identify the ones of the nodes which are members of loops and the ones of the nodes which are path search exit nodes,
  - loops including ones of the paths that reflect sequences of repetitive instruction block execution, and the ones of the nodes lying in the paths in loops being deemed members of a loop, and
  - path search exit nodes being the ones of the nodes which occur at the exit of a control substructure in the program flow representation and in the modified program flow representation;
- combining the loops into single nodes;
- selecting the ones of the nodes which have multiple predecessor nodes and a single successor node, and which are not path search nodes;
- replicating selected ones of the selected nodes such that a different copy of each selected node is formed to correspond to each predecessor node of that selected node;
- replacing each of the selected nodes in the initial program flow representation with the copies of that selected node; and
- connecting each of copies of each of the selected nodes to the predecessor node and the single successor node corresponding to that selected node,
- the replication of selected nodes and the connection of the copies forming a modified program flow representation.

57. The method of claim 56 wherein the step of replicating selected ones of the selected nodes includes the substep of
- choosing as the selected ones of the selected nodes only the ones of the selected nodes which are not successor nodes to other ones of the selected nodes.

* * * * *